US012657719B2

(12) United States Patent　(10) Patent No.: US 12,657,719 B2
Hu et al.　(45) Date of Patent: *Jun. 16, 2026

(54) SYSTEM AND METHOD FOR SPLICING IMAGES

(71) Applicant: SHANGHAI UNITED IMAGING HEALTHCARE CO., LTD., Shanghai (CN)

(72) Inventors: Yang Hu, Shanghai (CN); Jie Niu, Shanghai (CN); Liang Xu, Shanghai (CN); Yecheng Han, Shanghai (CN); Hanyu Wang, Shanghai (CN); Yueyan Bian, Shanghai (CN); Wanli Teng, Shanghai (CN); Kai Cui, Shanghai (CN); Le Yang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 120 days.

This patent is subject to a terminal disclaimer.

(21) Appl. No.: 18/433,311

(22) Filed: Feb. 5, 2024

(65) Prior Publication Data

US 2024/0212152 A1　Jun. 27, 2024

Related U.S. Application Data

(63) Continuation of application No. 17/819,925, filed on Aug. 15, 2022, now Pat. No. 11,893,738, which is a
(Continued)

(30) Foreign Application Priority Data

Jul. 14, 2016　(CN) .......................... 201610551631.1
Sep. 30, 2016　(CN) .......................... 201610875628.5
(Continued)

(51) Int. Cl.
 *G06T 7/00*　(2017.01)
 *G06T 7/11*　(2017.01)
 (Continued)

(52) U.S. Cl.
 CPC .............. *G06T 7/0014* (2013.01); *G06T 7/11* (2017.01); *G06T 7/174* (2017.01); *G06T 7/33* (2017.01);
 (Continued)

(58) Field of Classification Search
 None
 See application file for complete search history.

(56) References Cited

U.S. PATENT DOCUMENTS 5,528,290 A　6/1996　Saund
5,577,181 A　11/1996　Givens et al.
(Continued)

FOREIGN PATENT DOCUMENTS

CN　101442619 A　5/2009
CN　101510257 A　8/2009
(Continued)

OTHER PUBLICATIONS

Machine Translation CN 101556692 A (Year: 2009).*
(Continued)

*Primary Examiner* — Michelle M Entezari Hausmann
(74) *Attorney, Agent, or Firm* — METIS IP LLC

(57) ABSTRACT

The present disclosure relates to systems and methods for image splicing. The systems and methods may acquire a first image and a second image, determine a plurality of first feature points in a first region of the first image, determine a plurality of second feature points in a second region of the second image, then match the plurality of first feature points with the plurality of second feature points to generate a plurality of point pairs. Based on the plurality of point pairs,
(Continued)

1000

1010 Dividing the third region into a plurality of first sub-regions

1020 Dividing the fourth region into a plurality of second sub-regions

1030 Matching the plurality of first sub-regions and the plurality of second sub-regions to generate a plurality of initial sub-region pairs 1040 Is the number of the plurality of sub-region pairs larger than a threshold?

1050 Yes
Splicing the first image and the second image to generate the third image No 1060 Obtaining new images a third region on the first image and a fourth region on the second image may be determined. Finally, a third image may be generated based on the first image and the second image, wherein the third region of the first image may overlap with the fourth region of the second image in the third image.

20 Claims, 16 Drawing Sheets

Related U.S. Application Data continuation of application No. 16/806,207, filed on Mar. 2, 2020, now Pat. No. 11,416,993, which is a continuation of application No. 15/649,819, filed on Jul. 14, 2017, now Pat. No. 10,580,135.

(30) Foreign Application Priority Data

| Sep. 30, 2016 | (CN) | .......................... | 201610875710.8 |
|---|---|---|---|
| Sep. 30, 2016 | (CN) | .......................... | 201610877441.9 |
| Sep. 30, 2016 | (CN) | .......................... | 201610877463.5 |
| Sep. 30, 2016 | (CN) | .......................... | 201610916842.0 |
| Sep. 30, 2016 | (CN) | .......................... | 201610916844.X |

(51) Int. Cl.
  *G06T 7/174* (2017.01)
  *G06T 7/33* (2017.01)
(52) U.S. Cl.
  CPC ...... *G06T 7/97* (2017.01); *G06T 2207/10081* (2013.01)

(56) References Cited

U.S. PATENT DOCUMENTS

| 6,411,741 | B1 | 6/2002 | Hamamura et al. |
| 7,653,241 | B2 | 1/2010 | Kashino et al. |
| 8,254,697 | B2 | 8/2012 | Isard et al. |
| 8,554,016 | B2* | 10/2013 | Manson .................... G06T 7/33 |
| | | | 382/128 |
| 9,361,699 | B2 | 6/2016 | Liao et al. |
| 9,600,744 | B2* | 3/2017 | Pau ........................... G06T 3/18 |
| 9,838,614 | B1* | 12/2017 | Brailovskiy .......... H04N 5/265 |
| 9,965,218 | B1 | 5/2018 | Martin et al. |
| 10,198,158 | B2 | 2/2019 | Hao et al. |
| 10,755,449 | B2 | 8/2020 | Fukuda |
| 2001/0026643 | A1 | 10/2001 | Yamada |
| 2002/0087570 | A1 | 7/2002 | Jacquez et al. |
| 2003/0026469 | A1 | 2/2003 | Kreang-Arekul et al. |
| 2003/0076361 | A1 | 4/2003 | Hatanaka et al. |
| 2005/0169506 | A1 | 8/2005 | Fenrich et al. |
| 2005/0213849 | A1* | 9/2005 | Kreang-Arekul ..... G06T 3/4038 |
| | | | 382/284 |
| 2006/0009700 | A1 | 1/2006 | Brumfield et al. |
| 2007/0046596 | A1 | 3/2007 | Sakakibara et al. |
| 2008/0240613 | A1 | 10/2008 | Dietz et al. |
| 2009/0256908 | A1 | 10/2009 | Chen et al. |
| 2010/0014780 | A1 | 1/2010 | Kalayeh |
| 2010/0113091 | A1 | 5/2010 | Sharma |
| 2010/0194851 | A1 | 8/2010 | Pasupaleti et al. |
| 2010/0266189 | A1 | 10/2010 | Knapp et al. |
| 2010/0322475 | A1 | 12/2010 | Ikeda |
| 2011/0026792 | A1 | 2/2011 | Bertens et al. |
| 2011/0158533 | A1 | 6/2011 | Gutelzon et al. |
| 2012/0051635 | A1 | 3/2012 | Kunkel et al. |
| 2012/0250970 | A1 | 10/2012 | Tsubaki et al. |
| 2012/0290274 | A1 | 11/2012 | Seningen |
| 2013/0101189 | A1 | 4/2013 | Robitaille et al. |
| 2013/0208997 | A1 | 8/2013 | Liu |
| 2013/0245461 | A1 | 9/2013 | Maier-Hein et al. |
| 2013/0259401 | A1* | 10/2013 | Ohki ........................ G06T 11/60 |
| | | | 382/284 |

| 2014/0286475 | A1* | 9/2014 | Nakamura ................ G01T 1/16 |
| | | | 250/336.1 |
| 2014/0293096 | A1 | 10/2014 | Wang et al. |
| 2014/0321703 | A1 | 10/2014 | Inomata et al. |
| 2014/0354828 | A1 | 12/2014 | Rubinstein et al. |
| 2014/0362173 | A1 | 12/2014 | Doepke et al. |
| 2015/0294490 | A1* | 10/2015 | Lin ........................ G06T 3/4038 |
| | | | 382/195 |
| 2016/0050369 | A1 | 2/2016 | Takenaka et al. |
| 2016/0063705 | A1* | 3/2016 | Xu ........................ H04N 5/2624 |
| | | | 382/199 |
| 2016/0078584 | A1 | 3/2016 | Song et al. |
| 2016/0112616 | A1 | 4/2016 | Bonifer et al. |
| 2016/0125265 | A1 | 5/2016 | Xie et al. |
| 2016/0150211 | A1 | 5/2016 | Hwang et al. |
| 2016/0309086 | A1 | 10/2016 | Kimura et al. |
| 2017/0136948 | A1 | 5/2017 | Sypitkowski et al. |
| 2017/0178372 | A1* | 6/2017 | Gormish ................ G06T 11/60 |
| 2018/0012336 | A1* | 1/2018 | Cao ...................... H04N 23/698 |
| 2018/0040271 | A1 | 2/2018 | Jung et al. |
| 2019/0108851 | A1 | 4/2019 | Soulodre et al. |
| 2019/0164317 | A1 | 5/2019 | Tang et al. |
| 2019/0380670 | A1 | 12/2019 | Hofmann et al. |
| 2020/0358948 | A1* | 11/2020 | García Morate .. H04N 23/6811 |
| 2021/0093188 | A1 | 4/2021 | Jia et al. |
| 2025/0302417 | A1* | 10/2025 | Zhou .................... A61B 6/5241 |

FOREIGN PATENT DOCUMENTS

| CN | 101556692 | A | * | 10/2009 |
| CN | 101770568 | A | | 7/2010 |
| CN | 102737395 | A | | 10/2012 |
| CN | 102938145 | A | | 2/2013 |
| CN | 102968777 | A | | 3/2013 |
| CN | 103295209 | A | | 9/2013 |
| CN | 103514591 | A | | 1/2014 |
| CN | 103593832 | A | | 2/2014 |
| CN | 103679672 | A | | 3/2014 |
| CN | 103729654 | A | | 4/2014 |
| CN | 103761721 | A | | 4/2014 |
| CN | 103886611 | A | | 6/2014 |
| CN | 104376552 | A | | 2/2015 |
| CN | 104515502 | A | | 4/2015 |
| CN | 104574401 | A | | 4/2015 |
| CN | 104616297 | A | | 5/2015 |
| CN | 104717456 | A | | 6/2015 |
| CN | 104717465 | A | | 6/2015 |
| CN | 104820965 | A | | 8/2015 |
| CN | 104850851 | A | | 8/2015 |
| CN | 104881671 | A | | 9/2015 |
| CN | 104881877 | A | | 9/2015 |
| CN | 104966270 | A | | 10/2015 |
| CN | 105447864 | A | | 3/2016 |
| CN | 105554449 | A | | 5/2016 |
| CN | 105574815 | A | | 5/2016 |
| CN | 105701764 | A | | 6/2016 |
| JP | 2007036347 | A | | 2/2007 |
| KR | 20110116609 | A | | 10/2011 |

OTHER PUBLICATIONS

Li, Tong, Zhen Hai Liu, and Zhi Jun Ma. "A new method of panoramic image mosaic based on sift." Advanced Materials Research 816 (2013): 562-565. (Year: 2013).*

Jia, Jiaya, and Chi-Keung Tang. "Eliminating structure and intensity misalignment in image stitching." Tenth IEEE International Conference on Computer Vision (ICCV'05) vol. 1. vol. 2. IEEE, 2005. (Year: 2005).*

Xu, Chunbo, Juan Yan, and Huibin Yang. "Image stitching method based on image edge detection and SIFT algorithm." Proceedings of the 2021 5th International Conference on Electronic Information Technology and Computer Engineering. 2021. (Year: 2021).*

Wen, Hongyan et al., An Improved Algorithm for Image Mosaic, 2008 International Symposium on Information Science and Engineering, 497-500, 2008.

(56) References Cited

OTHER PUBLICATIONS

Kekre H. B. et al., Creating the Color Panoramic View using Medley of Grayscale and Color Partial Images, World Academy of Science, Engineering and Technology, 855-861, 2008.

Gong, Shengrong et al., Advanced Image and Video Processing Using MATLAB, Chapter 8, Image Stitching, 2018, 58 pages.

Yang, Wenbin et al., RTStitch: Real-time Stitching of High-resolution PCB Images, 2021 IEEE International Conference on Systems, Man, and Cybernetics, 541-546, 2021.

First Office Action in Chinese Application No. 201610877463.5 mailed on Jan. 28, 2019, 18 Pages.

Li, Yong, China Master's Theses Full-text Database, Research on Image Seamless Stitching and Uniform Color Technology, 2014.

Wang, Yuliang et al., Journal of Image and Graphics, Automatic Fundus Images Mosaic based on SIFT Feature, 16(4): 654-659, 2011.

Feng, Jia, China Master's Theses Full-text Database, The Research and Improvement of SIFT Algorithm, 2010.

Zhou, Baofu, China Master's Theses Full-text Database, Research of Image Mosaic Algorithm Based on Feature Points Detection, 2015.

Cao, Xinhua, Research on CT Image Registration and Mosaic Based on Feature Points Driving, 2011.

Wu, Jianning et al., Journal of Computer Applications, An image mosaic method based on interest points matching, 26(3): 610-612, 2006.

Xiao, Nanfeng, SIFT algorithm, p. 172, 2013.

First Office Action in Chinese Application No. 201610875710.8 mailed on Dec. 13, 2017, 25 pages.

The Second Office Action in Chinese Application No. 201610875710.8 mailed on Jun. 26, 2018, 51 pages.

First Office Action in Chinese Application No. 201610875628.5 mailed on Feb. 2, 2019, 25 pages.

Han, Xiaowei et al., Image Registration, Digital Image Fusion Technology, 2010, 19 pages.

Notification to Grant Patent Right for Invention in Chinese Application No. 201610551631.1 mailed on Apr. 2, 2021, 6 pages.

The Fifth Office Action in Chinese Application No. 201610916842.0 mailed on Aug. 5, 2020, 18 pages.

* cited by examiner

200

400

410

Acquiring a first image and a second image

420

Processing the first image and the second image

430

Generating a third image based on the processed first image and processed second image

600

610
Determining a plurality of
feature points in a first region
and a second region 620
Matching the plurality of
feature points to generate a
plurality of point pairs 630
Determining a third region
and a fourth region based on
the plurality of point pairs

700

710

Decomposing the first image and the second image

720

Generating a first difference image and a second difference image

730

Generating a plurality of extreme points based on the first difference image and the second difference image

740

Selecting, from the plurality of extreme points, a plurality of points as the plurality of feature points

900

910

Acquiring positions of the
plurality of point pairs

920

Determining an offset
between first image and
second image based on
positions of the plurality of
point pairs

930

Determining the third region
and the fourth region based
on the offset

1110

1120

1130

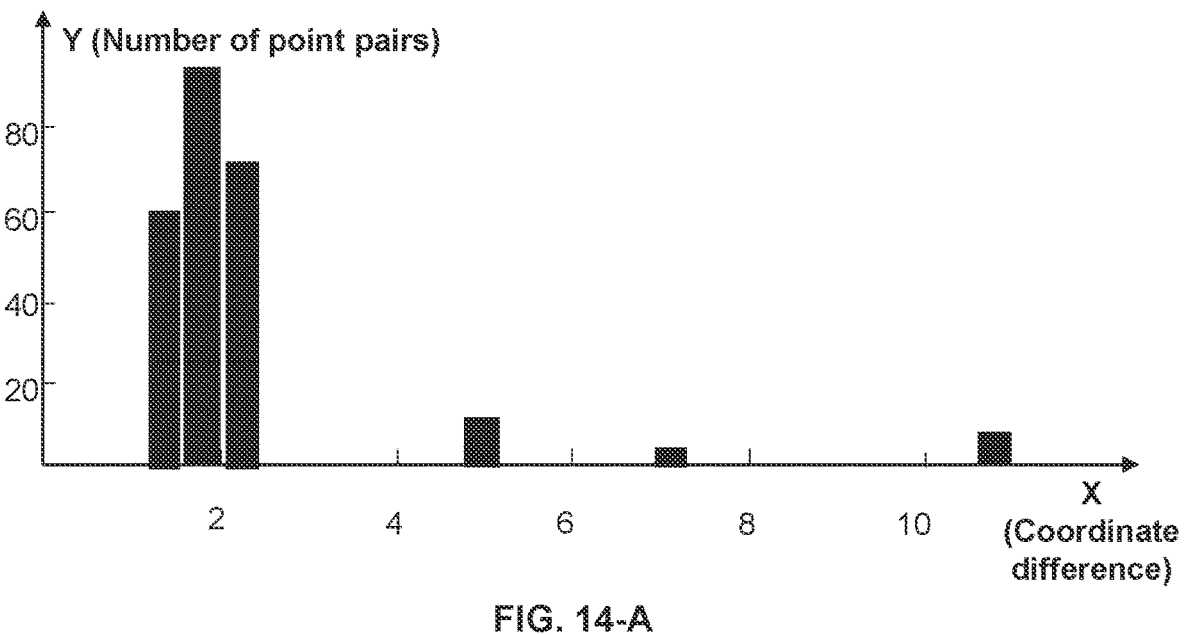
FIG. 14-A
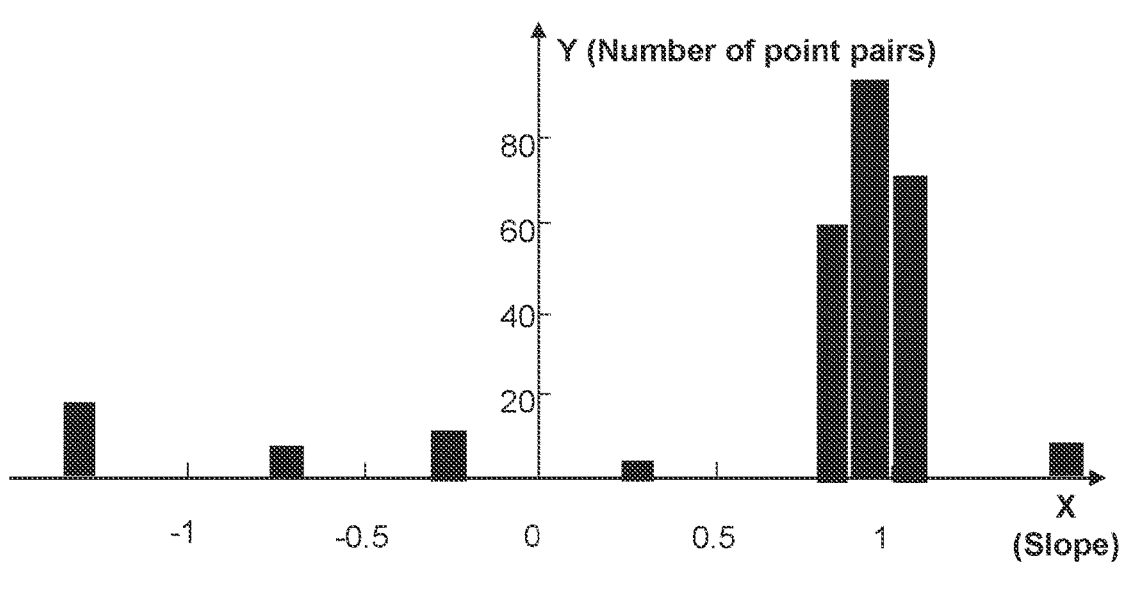
FIG. 14-B

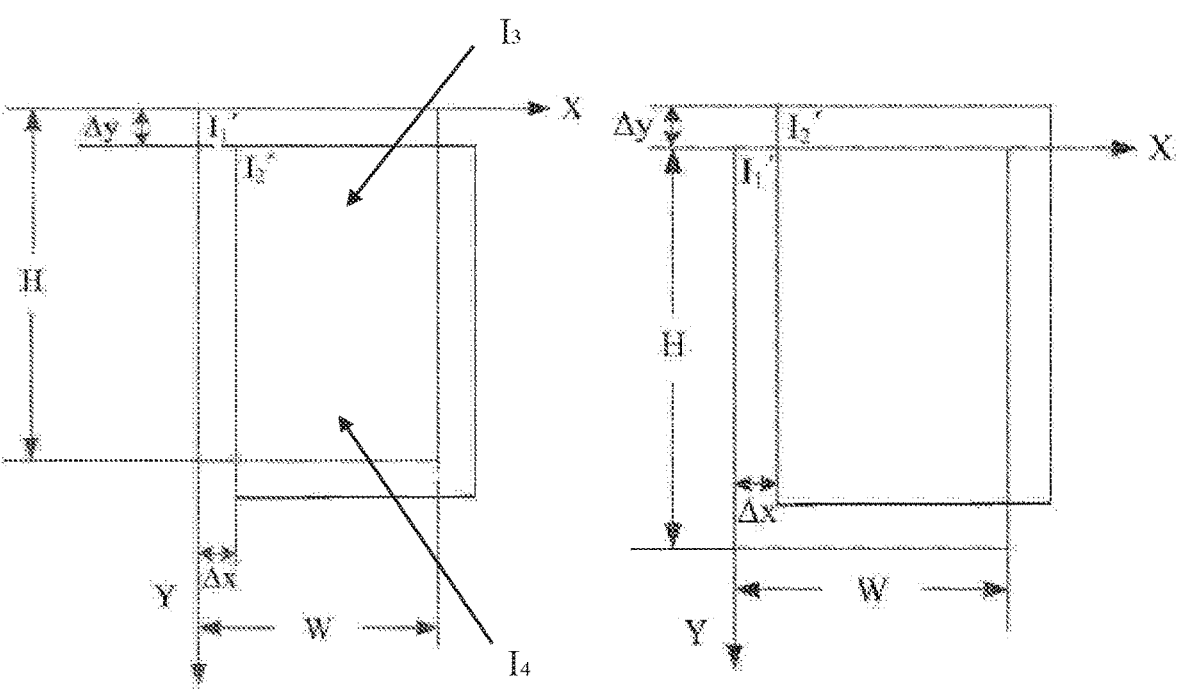
FIG. 16-A                    FIG. 16-B
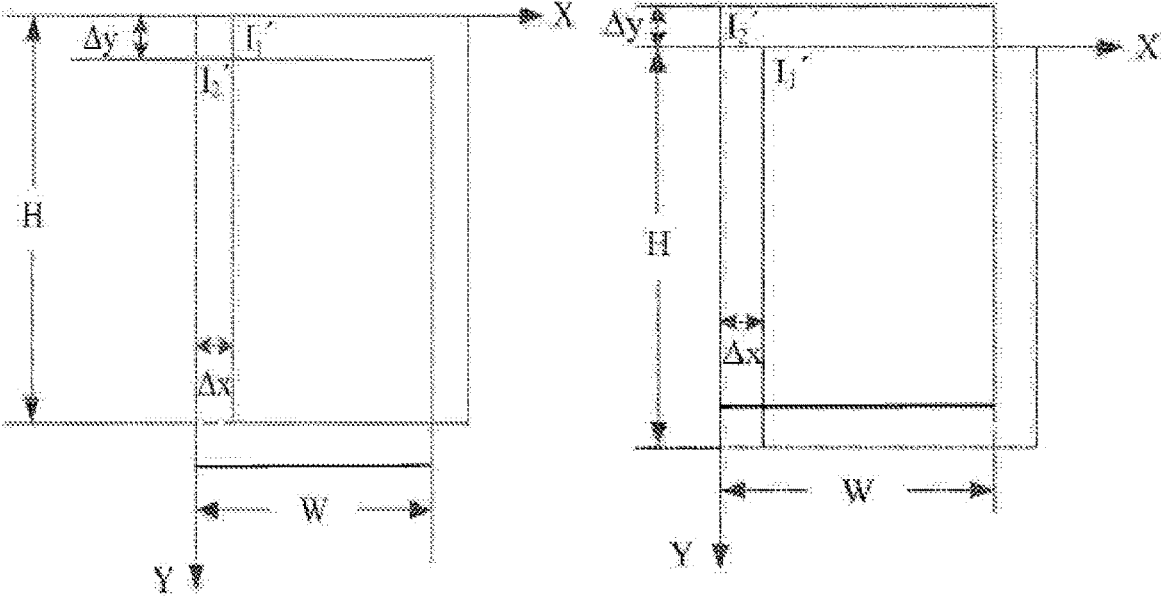
FIG. 16-C                    FIG. 16-D

SYSTEM AND METHOD FOR SPLICING IMAGES

CROSS-REFERENCE TO RELATED APPLICATIONS

This application is a continuation of U.S. patent application Ser. No. 17/819,925, filed on Aug. 15, 2022, which is a continuation of U.S. patent application Ser. No. 16/806,207, filed on Mar. 2, 2020, now U.S. Pat. No. 11,416,993, which is a continuation of U.S. patent application Ser. No. 15/649, 819, filed on Jul. 14, 2017, now U.S. Pat. No. 10,580,135, which claims priority of Chinese Patent Application No. 201610551631.1 filed on Jul. 14, 2016, Chinese Patent Application No. 201610875710.8 filed on Sep. 30, 2016, Chinese Patent Application No. 201610875628.5 filed on Sep. 30, 2016, Chinese Patent Application No. 201610877441.9 filed on Sep. 30, 2016, Chinese Patent Application No. 201610916842.0 filed on Sep. 30, 2016, Chinese Patent Application No. 201610916844.X filed on Sep. 30, 2016, and Chinese Patent Application No. 201610877463.5 filed on Sep. 30, 2016, the entire contents of each of which are hereby incorporated by reference.

TECHNICAL FIELD

The present disclosure generally relates to image processing, and more particularly, relates to methods and systems for image splicing.

BACKGROUND

Medical imaging equipment, such as digital radiography (DR) equipment is becoming increasingly popular. A medical imaging equipment generally includes a source that emits a sound wave or a ray to a patient and a detector that receives the sound wave or ray reflected by or passed through the patient and generates a corresponding reading. The reading may be reconstructed into an image. However, the source may only cover a portion of the patient at each time the patient is scanned and the images corresponding to all the portions being individually may have to be spliced in order to generate a whole image of the patient. There are some conventional splicing methods for X-ray images based on features, gray levels or transform domains. However, the existing splicing methods may have high complexity and low efficiency in detecting feature points in the images. In addition, matched point pairs generated by the conventional splicing methods may include many inaccurate point pairs. The inaccuracy of the point pairs may cause inaccuracy in the splicing of the images, which may affect the clinical diagnosis of the patient.

SUMMARY

According to an aspect of the present disclosure, a system is provided. The system may include at least one storage and at least one processor configured to communicate with the at least one storage. The at least one storage may include a set of instructions or programs. When the at least one processor executes the set of instructions or programs, the at least one processor may be directed to perform one or more of the following operations. The at least one processor may acquire a first image and a second image. The at least one processor may determine a plurality of first feature points in a first region of the first image and determine a plurality of second feature points in a second region of the second image. The at least one processor may match the plurality of first feature points with the plurality of second feature points to generate a plurality of point pairs. The at least one processor may determine a third region on the first image and a fourth region on the second image based on the plurality of point pairs. The at least one processor may generate a third image based on the first image and the second image, wherein the third region of the first image may overlap with the fourth region of the second image in the third image.

In some embodiments, the at least one processor may decompose the first image and the second image. The at least one processor may generate a first difference image corresponding to the decomposed first image, and a second difference image corresponding to the decomposed second image. The at least one processor may generate a plurality of extreme points based on the first difference image and grayscale values thereof. The at least one processor may generate a plurality of extreme points based on the second difference image and grayscale values thereof. The at least one processor may determine the plurality of first feature points and the plurality of second feature points based on the plurality of extreme points.

In some embodiments, the at least one processor may determine an offset between the first image and the second image based on respective positions of the plurality of point pairs in the first image and the second image. The at least one processor may determine the third region and the fourth region based on the offset.

In some embodiments, the at least one processor may select one of the first image and the second image as a reference image. Upon selecting the first image as the reference image, the at least one processor may adjust the grayscale of the second region in the second image based on the grayscale of the first region in the first image. Upon selecting the second image as the reference image, the at least one processor may adjust the grayscale of the first region in the first image based on the grayscale of the second region in the second image.

In some embodiments, the at least one processor may generate a plurality of initial point pairs based on the plurality of first feature points and the plurality of second feature points. The at least one processor may select the plurality of point pairs from the plurality of initial point pairs.

In some embodiments, the at least one processor may acquire first coordinates of each of the plurality of initial point pairs in the first image. The at least one processor may acquire second coordinates of the each of the plurality of initial point pairs in the second image. The at least one processor may determine coordinate differences between the first coordinates and the second coordinates for the each of the plurality of initial point pairs. The at least one processor may generate a histogram based on the coordinate differences and the observation times of coordinate differences. The at least one processor may select, from the plurality of initial point pairs, the plurality of point pairs that correspond to the largest observation time of the coordinate differences of the plurality of initial point pairs based on the histogram.

In some embodiments, the at least one processor may acquire first coordinates of each of the plurality of initial point pairs in the first image. The at least one processor may acquire second coordinates of the each of the plurality of initial point pairs in the second image. The at least one processor may determine a slope between the first coordinates and the second coordinates for the each of the plurality of initial point pairs. The at least one processor may generate a histogram based on the slopes and the observation times of slopes. The at least one processor may select, from the plurality of initial point pairs, the plurality of point pairs that correspond to the largest observation time of the slopes of the plurality of initial point pairs based on the histogram.

In some embodiments, the at least one processor may divide the third region into a plurality of first sub-regions. The at least one processor may divide the fourth region into a plurality of second sub-regions. The at least one processor may match the plurality of first sub-regions and the plurality of second sub-regions to generate a plurality of sub-region pairs. The at least one processor may determine whether the number of the plurality of sub-region pairs is greater than a threshold. Upon the determination that the number of the plurality of sub-region pairs is greater than the threshold, the at least one processor may splice the first image and the second image to generate the third image.

According to another aspect of the present disclosure, a method is provided. The method may include one or more of the following operations. A processor may acquire a first image and a second image. The processor may determine a plurality of first feature points in a first region of the first image and determine a plurality of second feature points in a second region of the second image. The processor may match the plurality of first feature points with the plurality of second feature points to generate a plurality of point pairs. The processor may determine a third region on the first image and a fourth region on the second image based on the plurality of point pairs. The processor may generate a third image based on the first image and the second image, wherein the third region of the first image may overlap with the fourth region of the second image in the third image According to another aspect of the present disclosure, a computer readable medium is provided. The computer readable medium may include executable instructions or programs. When executed by at least one processor, the executable instructions or programs may cause the at least one processor to effectuate a method. The method may include one or more of the following operations. The at least one processor may acquire a first image and a second image. The at least one processor may determine a plurality of first feature points in a first region of the first image and determine a plurality of second feature points in a second region of the second image. The at least one processor may match the plurality of first feature points with the plurality of second feature points to generate a plurality of point pairs. The at least one processor may determine a third region on the first image and a fourth region on the second image based on the plurality of point pairs. The at least one processor may generate a third image based on the first image and the second image, wherein the third region of the first image may overlap with the fourth region of the second image in the third image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 14-A and FIG. 14-B are schematic diagrams illustrating exemplary histograms according to some embodiments of the present disclosure;

FIG. 16-A, FIG. 16-B, FIG. 16-C and FIG. 16-D are schematic diagrams illustrating exemplary relative positions of the first image and the second image that are spliced according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
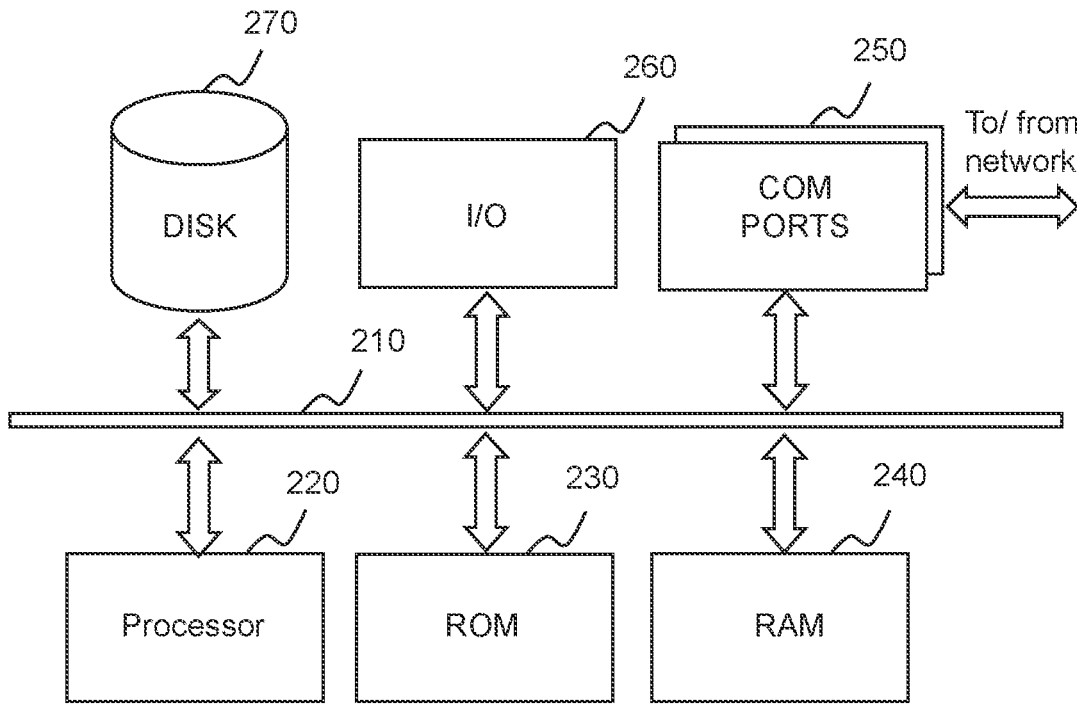
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., the processor 220 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a digital radiography (DR) system, a computed tomography (CT) system, an emission computed tomography (ECT) system, a magnetic resonance imaging (MRI) system, an ultrasonography system, an X-ray photography system, a positron emission tomography (PET) system, or the like, or any combination thereof.

The following description is provided to help better understanding the processing methods and/or systems. This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

Figure 1:
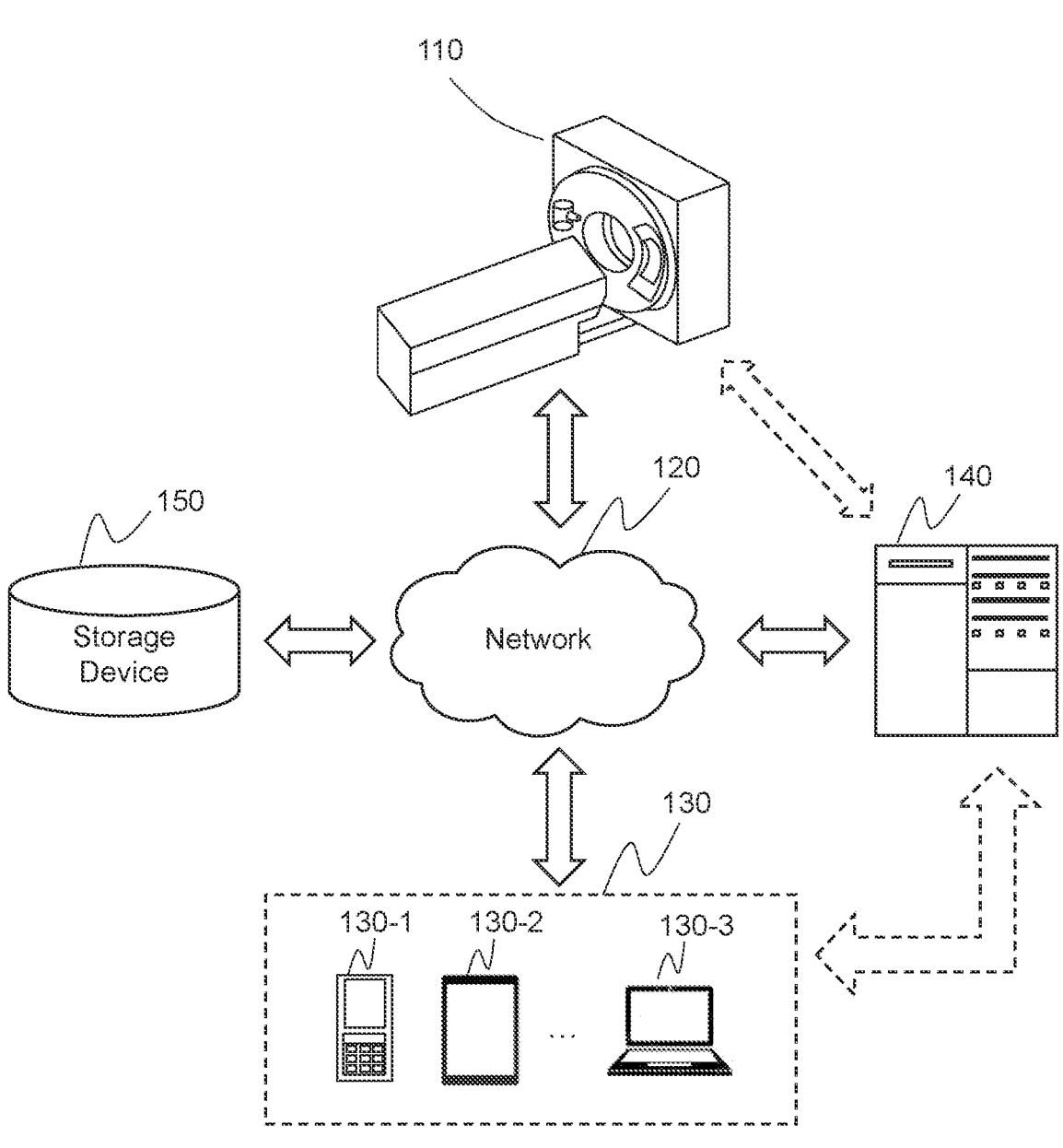
FIG. 1 is a schematic diagram illustrating an exemplary imaging system according to some embodiments of the present disclosure.

FIG. 1 is a schematic diagram illustrating an imaging system 100 according to some embodiments of the present disclosure. In some embodiments, the imaging system 100 may be a single modality imaging system including, for example, a digital subtraction angiography (DSA) system, a magnetic resonance imaging (MRI) system, a computed tomography angiography (CTA) system, a positron emission tomography (PET) system, a single photon emission computed tomography (SPECT) system, a computed tomography (CT) system, a digital radiography (DR) system, etc. In some embodiments, imaging system 100 may be a multi-modality imaging system including, for example, a positron emission tomography-computed tomography (PET-CT) system, a positron emission tomography-magnetic resonance imaging (PET-MRI) system, a single photon emission computed tomography-positron emission tomography (SPECT-PET) system, a digital subtraction angiography-magnetic resonance imaging (DSA-MRI) system, etc. For better understanding of the present disclosure, a DR system is taken as an example of imaging system 100. It should be noted that imaging system 100 described below is merely provided for illustration purposes, and not intended to limit the scope of the present disclosure.

As shown in FIG. 1, the imaging system 100 may include a scanner 110, a network 120, one or more terminals 130, a processing engine 140, and a storage device 150. The scanner 110 may include a gantry, a detector, a scanning region, a table, and a radioactive scanning source. The gantry may support the detector and the radioactive scanning source. An object may be placed on the table for scanning. The object may include a body, part of a body, a tissue, an organ, etc. The radioactive scanning source may emit a radioactive ray (e.g., an X-ray, a positron ray, or a gamma ray) to a particular scanning region of the object. The radioactive ray may decay while passing through the scanning region of the object. The detector may detect the decayed radioactive ray and generate a corresponding reading. The different areas of the scanning region may have different absorption rate of X-ray and may result in different readings on the detector. A processor may obtain the readings from the detector and reconstruct an image based on the readings. In some embodiments, the detector may include one or more detector units. The detector units may include a scintillation detector (e.g., a cesium iodide detector), a gas detector, etc. The detector unit may include a single-row detector and/or a multi-rows detector.

The network 120 may include any suitable network that can facilitate exchange of information and/or data for the imaging system 100. In some embodiments, one or more components of the imaging system 100 (e.g., the scanner 110, the terminal 130, the processing engine 140, the storage device 150, etc.) may communicate with each other via the network 120. For example, the processing engine 140 may obtain information associated with the radioactive scanning source from the scanner 110 via the network 120. As another example, the processing engine 140 may obtain user instructions from the terminal 130 via the network 120. The network 120 may include a public network (e.g., the Internet), a private network (e.g., a local area network (LAN), a wide area network (WAN), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process data and/or information obtained from the scanner 110, the terminal 130, and/or the storage device 150. For example, the processing engine 140 may obtain information associated with the radioactive scanning source and modify the information associated with the radioactive scanning source. In some embodiments, the processing engine 140 may acquire required image data from a plurality of candidate images. For example, the processing engine may acquire a first image and a second image as an image pair. The processing engine 140 may process the acquired image pair and generate a new image based on the acquired image pair. For example, the processing engine 140 may generate a new image by splicing the first image and the second image. In some embodiments, the processing engine 140 may be a single server or a server group. The server group may be centralized or distributed. In some embodiments, the processing engine 140 may be local or remote. For example, the processing engine 140 may access information and/or data stored in the scanner 110, the terminal 130, and/or the storage device 150 via the network 120. As another example, the processing engine 140 may be directly connected to the scanner 110, the terminal 130 and/or the storage device 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The storage device 150 may store data, instructions, and/or any other information. In some embodiments, the storage device 150 may store data obtained from the terminal 130 and/or the processing engine 140. In some embodiments, the storage device 150 may store data and/or instructions that the processing engine 140 and/or the terminal 130 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the imaging system 100 (e.g., the processing engine 140, the terminal 130, etc.). One or more components in the imaging system 100 may access the data or instructions stored in the storage device 150 via the network 120. In some embodiments, the storage device 150 may be directly connected to or communicate with one or more other components in the imaging system 100 (e.g., the scanner 110, the processing engine 140, the terminal 130, etc.). In some embodiments, the storage device 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a communication bus 210, a processor 220, a storage, an input/output (I/O) 260, and a communication port 250.

The processor 220 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 220 may process information associated with the radioactive scanning source obtained from the scanner 110, the terminal 130, the storage device 150, and/or any other component of the imaging system 100.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage may store data/information obtained from the scanner 110, the terminal 130, the storage device 150, and/or any other component of the imaging system 100. In some embodiments, the storage may include a mass storage, a removable storage, a volatile read-and-write memory, a random access memory (RAM) 240, a read-only memory (ROM) 230, a disk 270, or the like, or any combination thereof. In some embodiments, the storage may store one or more programs and/or instructions to perform exemplary methods described in the present disclosure. For example, the storage may store a program for the processing engine 140 for determining modified information associated with the images splicing.

The I/O 260 may input and/or output signals, data, information, etc. In some embodiments, the I/O 260 may enable a user interaction with the processing engine 140. In some embodiments, the I/O 260 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 250 may be connected to a network (e.g., the network 120) to facilitate data communications. The communication port 250 may establish connections between the processing engine 140 and the scanner 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 250 may be and/or include a standardized communication port, such as RS232, RS485, etc. In some embodiments, the communication port 250 may be a specially designed communication port. For example, the communication port 250 may be designed in accordance with the digital imaging and communications in medicine (DICOM) protocol.

Figure 3:
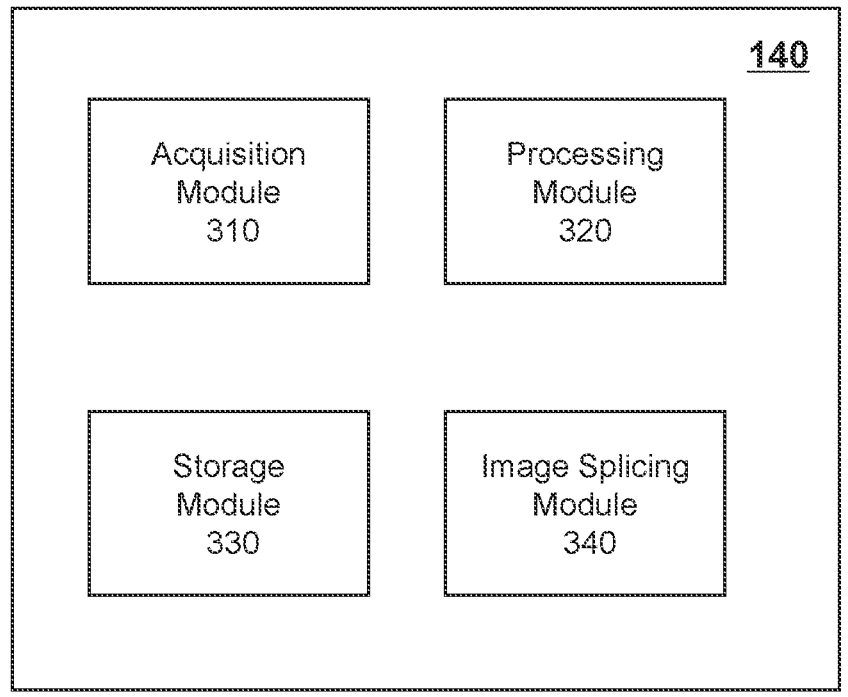
FIG. 3 is a block diagram illustrating an exemplary processing engine according to some embodiments of the present disclosure.

FIG. 3 is a block diagram illustrating an exemplary processing engine according to some embodiments of the present disclosure. The processing engine 140 may include an acquisition module 310, a processing module 320, a storage module 330 and an image splicing module 340. These modules may be interconnected. The connection may be wireless or wired.

The acquisition module 310 may be configured to acquire data from the network 120. The data may be acquired from a scanning device (e.g., scanner 110) or a storage medium (e.g., storage device 150). In some embodiments, the acquired data may be selected and inserted by users. In some embodiments, the acquired data may be image data. The image data may include but not limited to scanned images, original data of images, reconstructed images, corrected images, or the like, or any combinations thereof. In some embodiments, the acquired images may include at least two images (for example, a first image and a second image). The first image and the second image may each have a region with similar shape and size. For example, two different scanning images may both include an overlapping region of a same organ (e.g., a lung, etc.) or a same part of a organ. A new image may be generated by splicing the first image and the second image at the overlapping regions. In some embodiments, the two images to be spliced may be two adjacent images acquired by an X ray radiography system. In some embodiments, it is assumed that there is no rotation between the two adjacent images, the plane of the scanned body and the plane of the detector are parallel, and the magnification differences between the two adjacent images may be negligible. Based on these assumptions, there is only a translation (an offset in the horizontal direction and an offset in the vertical direction) between the two adjacent images. When acquiring images by the X ray radiography system, the detector and the tube may move along the direction of the column or a vertical direction and the patient may keep a standing posture (also referred to stereo shooting), or move along the X-axis direction or a horizontal direction of the plate and the patient may keep a lying posture (also referred to supine shooting).

The processing module 320 may be configured to process the acquired images. The acquired images may have different shapes or sizes, and may contain noises, and therefore may need to be processed before further operations. In some embodiments, the processing module 320 may adjust the shape or size of the first image and the second image, perform noise reduction and enhance the first image and the second image, determine the parameters of the first image and the second image, and determine the overlapping region of the first image and the second image, etc. Wherein the overlapping region may be determined based on the parameters of the first image and the second image. For example, if two different images with an overlapping region is required to be spliced, the overlapping region needs to be adjusted to a same shape, same size, same resolution and same angle.

Storage module 330 may be configured to store the data. The stored data may include data acquired by acquisition module 310, data processed by processing module 320, spliced image data and temporary data, etc. The temporary data may include the data formed during the images acquiring, images processing and/or images splicing. In some embodiments, the storage module 330 may include a mass storage, a removable storage, a volatile read-and-write memory, a read-only memory (ROM), or the like, or any combination thereof. In some embodiments, the storage module 330 may store one or more programs and/or instructions to perform the processes implemented in the processing engine. For example, the storage module 330 may store a program for the image splicing module 340 to determine splicing modes.

Image splicing module 340 may be configured to splice the images. After being processed, the two images may be spliced to generate a third image. The third image may be shown to the users for further operation. The image splicing module 340 may determine the splicing mode of the first image and the second image. In some embodiments, the image splicing module 340 may perform the program/instruction stored in the storage module 330 to splice the first image and the second image. When the splicing is completed, the image splicing module 340 may determine the quality of the splicing based on, e.g., whether the overlapping region coincides, whether the splicing regions are smooth, etc. If the splicing quality is not high enough, the image splicing module may perform the splicing of the first image and the second image again.

Figure 4:
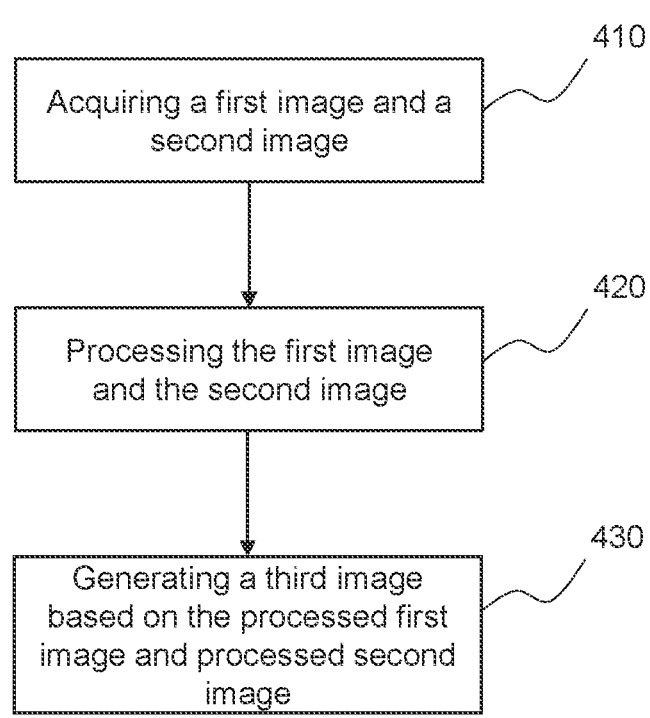
FIG. 4 is a flowchart illustrating an exemplary process for generating a third image according to some embodiments of the present disclosure.

FIG. 4 is a flowchart illustrating an exemplary process for generating an image according to some embodiments of the present disclosure. In step 410, the processing engine 140 may acquire a first image and a second image. In some embodiments, the processing engine 140 may first obtain a plurality of scanned images. Then the processing engine and/or a user may select a first image and a second image from the plurality of scanned images. The first image and the second image may have an overlapping region.

In step 420, the processing engine 140 may process the first image and the second image. In some embodiments, the processing of the first and the second image may include adjusting the shape or size of the first image and the second image, performing noise reduction and enhancing the first image and the second image, determining the parameters of the first image and the second image, and determining the overlapping region of the first image and the second image, etc. For example, the processing engine may adjust the size of the first or the second image so that their sizes are similar. The processing engine 140 may perform noise reduction and enhance the first image and the second image to get a better image quality. The processing engine may calibrate the overlapping region of the first image and the second image. In some embodiments, the processing engine 140 may select a reference image from the first image and the second image, and adjust the grayscale of the other image based on the grayscale of the selected image. The detailed description of selecting a reference image and adjusting another image based on the grayscale of the reference image may be found in FIG. 15.

In step 430, the processing engine 140 may generate a third image based on the processed first image and the processed second image. The third image may be a spliced image, a corrected image, a summated image, or a subtracted image. The summated image is generated by performing an image summation between the first image and the second image. The subtracted image is generated by performing an image subtraction between the first image and the second image. In some embodiments, the spliced image may be generated by splicing the first image and the second image in a particular splicing mode. The splicing mode may include but not limited to region splicing mode, feature splicing mode, and compensation splicing mode, etc. In some embodiments, the third image may be generated based on the parameters of the first and the second image.

Figure 5:
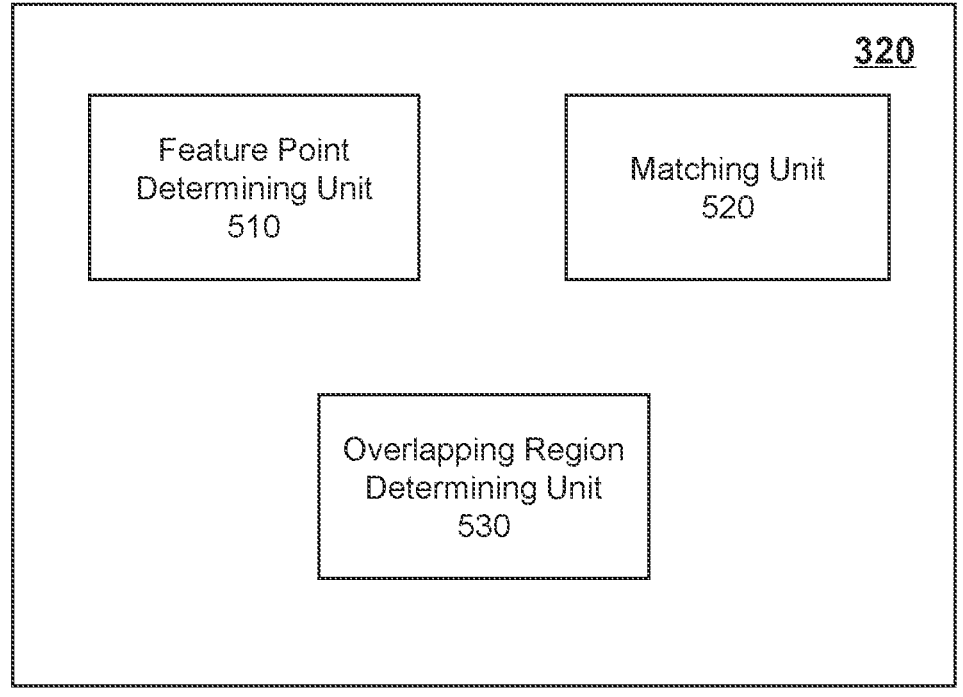
FIG. 5 is a block diagram illustrating an exemplary processing module according to some embodiments of the present disclosure.

FIG. 5 is a block diagram illustrating an exemplary processing module according to some embodiments of the present disclosure. The processing module 320 may include a feature point determining unit 510, a matching unit 520, and an overlapping region determining unit 530. These units may be interconnected with each other. For example, the feature point determining unit 510 may transmit the determined feature points to the matching unit 520 to generate matched point pairs, and the matching unit 520 may transmit the point pairs to overlapping region determining unit 530 to determine the overlapping region.

The feature point determining unit 510 may be configured to determine a plurality of feature points The feature points may refer to the points that have distinctive features in the image and may reflect substitutive characteristics of the image. The feature points may identify the target objects in the image. In the image processing, the feature points may refer to the points where the grayscale of the image changes sharply or the points with high curvature on the edge of the image. The plurality of feature points may be used to locate in a first region and a second region. For example, the feature point may be an gravity point of the first region or the second region. The feature point may be a central point of the first region or the second region. The feature point may be an angular point of the first region or the second region. The feature point may be located in the boundary of the first or second region at intervals. The first region and the second region may be regions of interest (ROI) in the first image and the second image respectively. The first region and the second region may include an overlapping region. For example, part or all of the first and the second region may be same or similar. After determining the feature points, the feature point determining unit 510 may transmit the feature points to the matching unit 520 for further operations.

The matching unit 520 may be configured to match the plurality of feature points to generate a plurality of point pairs. Each of the point pairs may include two matched feature points. In some embodiments, a feature point in the first region may match a plurality of feature points in the second region (or a plurality of feature points in the first region may match one feature point in the second region). In this case, the matching unit 520 may select, from the plurality of feature points in the second region, a feature point that matches the feature point in the first region best. For example, the best matched feature point in the second region may have a feature vector same as or similar to that of the feature point in the first region. In some embodiments, the feature point in the first region may not match any feature point in the second region, so the matching unit 520 may remove the feature point in the first region. The matching unit 520 may traverse every feature point in the first region and the second region, and match the plurality of feature points to generate a plurality of point pairs. In some embodiments, there may be some inaccurate point pairs in the plurality of point pairs, which may affect the quality of image splicing. The matching unit 520 may remove the inaccurate point pairs from the plurality of point pairs and assure the selected point pairs are correctly matched. After matching the point pairs, the matching unit 520 may transmit the point pairs to the overlapping region determining unit 530 for further operations.

The overlapping region determining unit 530 may determine an overlapping region based on the plurality of point pairs. The overlapping region in the first image may refer to a third region, and the overlapping region in the second image may refer to a fourth region. In some embodiments, the third region and the fourth region may have same or similar shape and size. In some embodiments, an offset between the first image and the second image may be obtained based on the plurality of point pairs. The third region and the fourth region may then be determined based on the offset.

Figure 6:
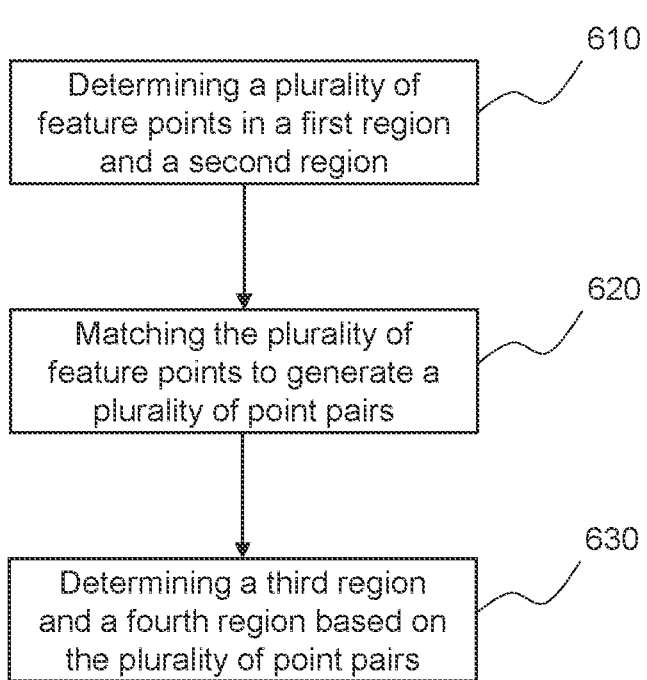
FIG. 6 is a flowchart illustrating an exemplary process for processing images according to some embodiments of the present disclosure.

FIG. 6 is a flowchart illustrating an exemplary process for processing images according to some embodiments of the present disclosure. The process 600 may be performed by processing module 320.

In step 610, the processing module 320 may determine a plurality of feature points in the first region and the second region. The feature points may refer to the points that have distinctive features in the image and may reflect substitutive characteristics of the image. In the image processing, the feature points may refer to extreme points where the gray-scale of the image changes sharply or the points with high curvature on the edge of the image. The extreme points may be determined as the initial feature points, and then the processing module 320 may select a plurality of points from the plurality of extreme points as the plurality of feature points. When the feature points have been determined, the feature points may be used to determine the point pairs.

In step 620, the processing module 320 may match the plurality of feature points to generate a plurality of point pairs. The processing module 320 may traverse every feature point in the first region and the second region, and match the plurality of feature points to generate a plurality of initial point pairs. There may be some inaccurate point pairs among the plurality of initial point pairs, which may affect the image splicing quality. The processing module 320 may remove the inaccurate point pairs from the plurality of initial point pairs.

In step 630, the processing module 320 may determine a third region and a fourth region based on the plurality of the point pairs. The third region may refer to the overlapping region in the first image, and the fourth region may refer to the overlapping region in the second image. The third region and the fourth region may have similar shape and size. Once the point pairs are determined, the third region and the fourth region may be determined. For example, an offset between the first image and the second image may be obtained based on the plurality of point pairs. The third region and the fourth region may then be determined based on the offset.

Figure 7:
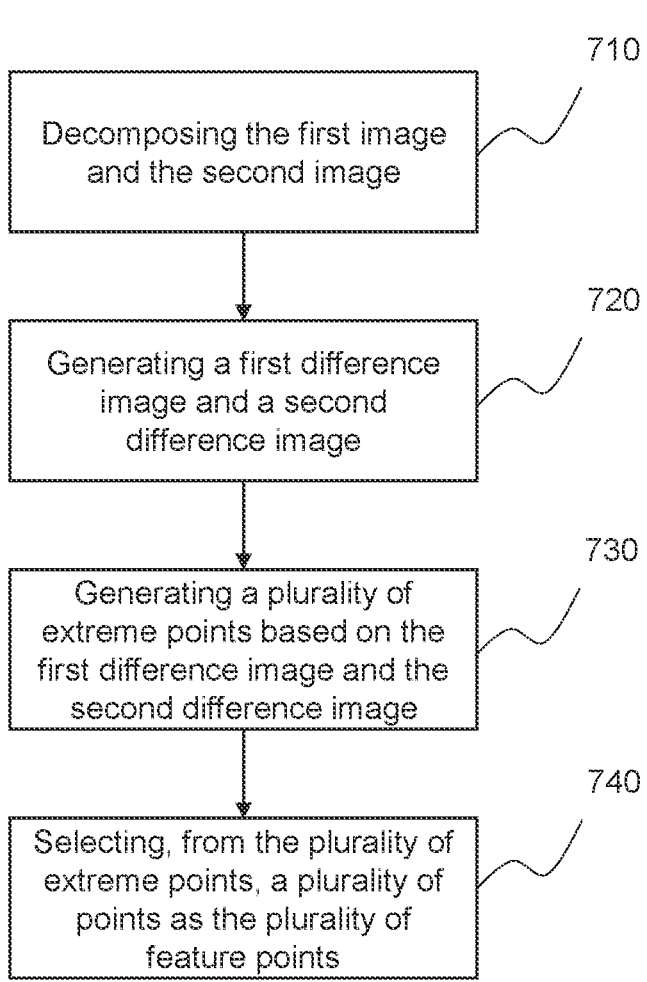
FIG. 7 is a flowchart illustrating an exemplary process for determining a plurality of feature points according to some embodiments of the present disclosure.

FIG. 7 is a flowchart illustrating an exemplary process for determining a plurality of feature points according to some embodiments of the present disclosure. The process 700 may be performed by processing module 320.

In step 710, the processing module 320 may decompose the first image and the second image. The decomposition of the first image and the second image may be Gaussian pyramid decomposition. For example, the processing module 320 may perform a Gaussian Pyramid decomposition to the first image and the second image, and build a first Gaussian Pyramid image and a second Gaussian Pyramid image respectively. The first Gaussian Pyramid image may include a plurality of first Gaussian smoothing images and the second Gaussian Pyramid image may include a plurality of second Gaussian smoothing images. The plurality of first Gaussian smoothing images and the plurality of second Gaussian smoothing images may be arranged in layers. In some embodiments, the Gaussian Pyramid decomposition on the image may include: executing a convolution between the first image and the Gaussian function to generate a first Gaussian smoothing image, executing a convolution between the second image and the Gaussian function to generate a second Gaussian smoothing image, and down-sampling the first Gaussian smoothing image and the second Gaussian smoothing image in different scales to generate the first Gaussian Pyramid image and the second Gaussian Pyramid image. In particular, the Gaussian smoothing image in a particular scale σ may be obtained by the following formula (1):

$$L(x, y, \sigma) = G(x, y, \sigma) * I(x, y) \tag{1}$$

where I(x, y) denotes the image to be decomposed, G(x, y, σ) denotes the Gaussian function, L(x, y, σ) denotes the Gaussian smoothing image, σ denotes the scale of the Gaussian kernel, and (x, y) denotes the coordinate of the pixel point. By adjusting the scale σ, multiple possible Gaussian smoothing images may be obtained. In some embodiments, the multiple possible Gaussian smoothing images may be arranged in multiple successive layers (like layers of a pyramid) wherein each layer of the Gaussian smoothing image may correspond to a particular scale σ.

The Gaussian function G(x, y, σ) may be expressed as:

$$G(x, y, \sigma) = \frac{1}{2\pi\sigma^2} \exp\left\{-\frac{(x - x_i)^2 + (y - y_i)^2}{2\sigma^2}\right\} \tag{2}$$

where $(x_i, y_i)$ denotes the center of the Gaussian kernel. When σ gradually increases, the scale of the generated Gaussian smooth image may be increased. By down-sampling the Gaussian smooth image, a Gaussian Pyramid image may be generated. In some embodiments, the number of feature points may be related with the scale of the Gaussian smooth image (or σ). By controlling the size of σ, the number of feature points and the time required to detect the feature points may be controlled.

In step 720, a first Gaussian difference Pyramid image (also referred to as a first difference image) and a second Gaussian difference Pyramid image (also referred to as a second difference image) may be generated. For example, a Gaussian difference pyramid image may be determined based on the following formula (3):

$$D(x, y, \sigma) = [G(x, y, k\sigma) - G(x, y, \sigma)] * I(x, y) = \qquad (3)$$

$$G(x, y, k\sigma) * I(x, y) - G(x, y, \sigma) * I(x, y)$$

wherein, $D(x, y, \sigma)$ denotes a Gaussian difference Pyramid image, $G(x, y, k\sigma) * I(x,y)$ and $G(x,y,\sigma) * I(x,y)$ denote two Gaussian smoothing image $L(x, y, k\sigma)$ and $L(x, y, \sigma)$ respectively. Hence, the formula (3) may be simplified as:

$$D(x, y, \sigma) = L(x, y, k\sigma) - L(x, y, \sigma) \qquad (4)$$

When the Gaussian smoothing images are arranged in layers, the difference of $L(x, y, k\sigma)$ and $L(x, y, \sigma)$ may represent a difference between two adjacent layers of Gaussian smoothing images that each corresponds to a scale of $k\sigma$ and $\sigma$, respectively.

In step 730, the processing module 320 may generate a plurality of extreme points based on the first difference image and a plurality of extreme points based on the second difference image. If multiple Gaussian difference pyramid images are arranged in layers, the processing module 320 may traverse every layer of the Gaussian difference pyramid image, and search for the existing extreme points in every layer of the Gaussian difference pyramid image. For example, a pixel point that has largest absolute value of grayscale in a preset size of region may be determined as an extreme point. The preset size of region may be associated with the actual requirement (for example, the intensity of the feature points and the size of the area where the feature points is located). Merely by way of example, the region may be a square of 3×3 pixels, a square of 5×5 pixels, etc. In some embodiment, in every layer of Gaussian difference pyramid image, the absolute value of the grayscale of each pixel point in a preset size of region may be compared with each other. When the absolute value of the grayscale of a pixel point is larger than the absolute value of the grayscale of other pixel points, the pixel point is determined as the extreme point in this layer of the Gaussian difference pyramid image. The detailed description may be found elsewhere in the present disclosure. See, e.g., FIG. 11 and the corresponding descriptions.

In some embodiments, there may be a plurality of possible extreme points in each layer of the Gaussian difference pyramid image. For example, a pixel point P may have an absolute value of grayscale greater than other pixel points in a preset size of region. Before a pixel point P is determined as an extreme point, the position of the pixel point P may be modified based on the pre-determined extreme points so that the accuracy of the position of extreme point corresponding to pixel point P may be increased. The pixel point P may be modified based on the following process. Firstly, an offset $\delta$ may be acquired by the following formula (5):

$$\delta = -\frac{\partial D^T}{\partial X}\left(\frac{\partial^2 D}{\partial X^2}\right)^{-1}, \qquad (5)$$

where D denotes the Gaussian difference pyramid image, $X=(\Delta x, \Delta y, \Delta\sigma)^T$, $\Delta x$ denotes difference between horizontal coordinate x of point P and horizontal coordinate $x_p$ of modified point P, $\Delta y$ denotes difference between vertical coordinate y of point P and vertical coordinate $y_p$ of modified point P, $\Delta\sigma$ denotes the difference between $\sigma$ and $\sigma_p$. After calculating $\delta$, the processing module may add $\Delta x$, $\Delta y$ and $\Delta\sigma$ to the coordinate x, coordinate y and $\sigma$, to determine the position of the modified pixel point P. The modified pixel point P may be determined as the extreme point.

In some embodiments, when the processing module 320 determines the extreme points, it may sort the extreme points in a descending order of the absolute value of grayscale of the extreme points. The processing module 320 may determine N pixel points with the highest absolute value of grayscale (N is preset by user according to experience), and modify the positions of these pixel points. The modified pixel points may be determined as the extreme points. This method of determining extreme points may have a high accuracy and may increase the speed of detecting the feature points in the images.

In step 740, the processing module 320 may select a plurality of points from the plurality of extreme points as the plurality of feature points. In some embodiments, extreme points on the sharp boundaries are inaccurate. Therefore, the processing module 320 may remove the pixel points on the sharp boundaries of the image to generate more accurate feature points in the image. In some embodiments, the pixel points on the sharp boundaries may have a larger principal curvature in the direction perpendicular to the boundary, and a smaller principal curvature in the direction tangential to the boundary, so the pixel points on the sharp boundaries may be determined based on the principal curvatures. In addition, the value of the principal curvatures may be proportional to the feature value of Hessian matrix, and the principal curvature may be determined by calculating the feature value of the Hessian matrix. Based on the determined principal curvature, the pixel points on the sharp boundaries (inaccurate feature points) may be found. The Hessian matrix may be expressed as:

$$H = \begin{bmatrix} D_{xx} & D_{xy} \\ D_{xy} & D_{yy} \end{bmatrix} \qquad (6)$$

where D denotes the Gaussian difference function, and $$D_{xx} = D(x+1, y, \sigma) + D(x-1, y, \sigma) - 2 \times D(x, y, \sigma) \qquad (7)$$

$$D_{yy} = D(x, y+1, \sigma) + D(x, y-1, \sigma) - 2 \times D(x, y, \sigma) \qquad (8)$$

$$D_{xy} = 0.25 \times [D(x+1, y+1, \sigma) + \qquad (9)$$

$$D(x-1, y-1, \sigma) - D(x-1, y+1, \sigma) - D(x+1, y-1, \sigma)]$$

where (x, y) denotes the coordinate of the extreme point.

Specifically, the processing module 320 may calculate the largest principal curvature and the smallest principal curvature of the extreme points based on the change of surrounding pixel points (also referred to as neighborhood regions), and determine whether the extreme point is on the sharp boundary of the image according to the ratio of the largest principal curvature to the smallest principal curvature of the neighborhood regions. For example, if the ratio of the largest principal curvature to the smallest principal curvature is larger than a preset threshold, it may indicate that the extreme point in that neighborhood region is on the sharp boundary of the image. As mentioned above, the value of the principal curvature is proportional to the feature value of the Hessian matrix, so the ratio of the largest principal curvature to the smallest principal curvature may be determined by calculating the ratio of the largest feature value and the smallest feature value of the Hessian matrix.

The processing module 320 may calculate the ratio of the largest feature value to the smallest feature value of the Hessian matrix, and then compare the ratio with a preset threshold. In this embodiment, the preset threshold may vary between 1 and 30. For example, the threshold may be 20, and the processing module may determine whether the ratio of the largest feature value to the smallest feature value of the Hessian matrix is larger than 20. Upon the determination that the ratio of the largest feature value to the smallest feature value of the Hessian matrix is larger than 20, the processing module 320 may determine that the extreme points are on the sharp boundaries of the image and may remove them from the plurality of extreme points. Finally, the remaining extreme points (or accurate extreme points) may be determined as feature points. In some embodiments, the feature points in the first region of the first image may be defined as the first feature points, and the feature points in the second region of the second image may be defined as the second feature points.

Figure 8:
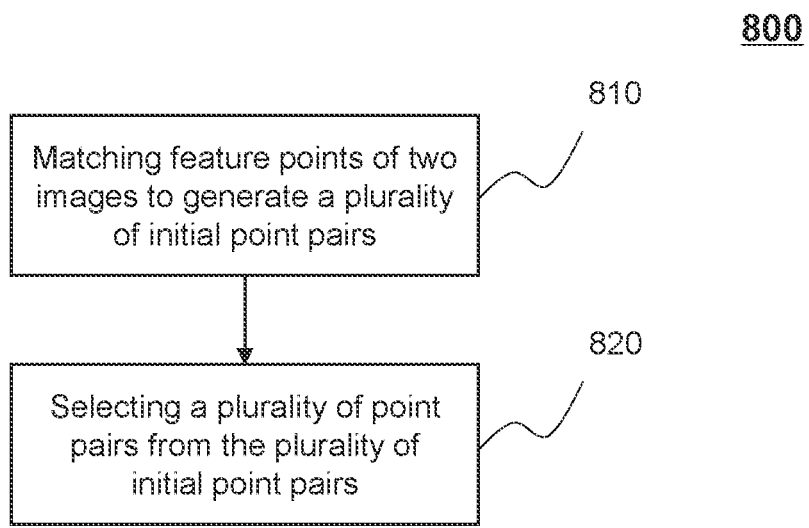
FIG. 8 is a flowchart illustrating an exemplary process for matching point pairs according to some embodiments of the present disclosure.

FIG. 8 is a flowchart illustrating an exemplary process for matching point pairs according to some embodiments of the present disclosure. The process 800 may be stored in the storage module 330, and may be performed by processing module 320.

In step 810, the processing module 320 may match feature points of two images to generate a plurality of initial point pairs. In some embodiments, the processing module 320 may compare the first feature points in the first image and the second feature points in the second image to generate a plurality of initial point pairs. In some embodiments, the feature points in the first image and the second image may be obtained by a method disclosed in process 700. The processing module 320 may determine a plurality of feature vectors corresponding to the feature points. The feature vectors may each represent a gradient of absolute value of greyscale in a neighborhood region of one of the feature points. The processing module 320 may match the first feature points with the second feature points based on the feature vectors (for example, the Euclidean distance of the feature vectors). In some embodiments, whether a pair of first feature point and second feature point is matched may be determined based on whether the Euclidean distance of the feature vectors of the point pair is less than a preset threshold.

In some embodiments, the processing module 320 may determine a first set of point pairs and a second point pairs. For example, the processing module may match every feature point in the first image to all the feature points in the second image to generate a first set of point pairs. Similarly, the processing module may match every feature point in the second image to all the feature points in the first image to generate a second set of point pairs. Then the processing module 320 make an intersection between the first set and the second set to generate the initial point pairs in the first image and the second image.

In step 820, the processing module 320 may remove inaccurate point pairs from the plurality of initial point pairs. For example, the processing module 320 may put the initial point pairs in a histogram and determine the accurate (and/or inaccurate) point pairs based on the histogram.

Figure 13:
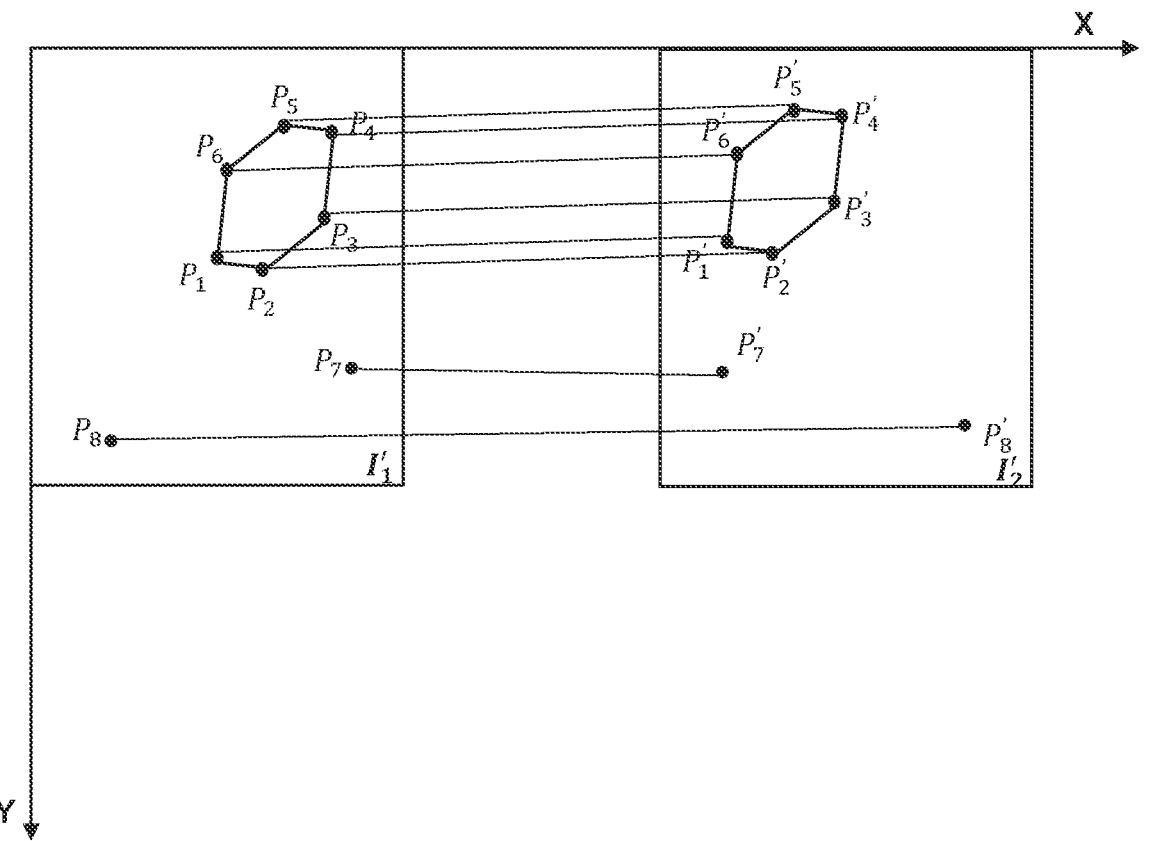
FIG. 13 is a schematic diagram illustrating exemplary process of determining point pairs based on the coordinates of each of the two points of the initial point pair according to some embodiments of the present disclosure.

In some embodiments, the processing module 320 may acquire first coordinate of each of the plurality of initial point pairs in the first image and second coordinate of the each of the plurality of initial point pairs in the second image. The processing module 320 may determine coordinate differences between the first coordinate and the second coordinate of the each of the plurality of initial point pairs. Furthermore, the processing module 320 may generate a histogram based on the value of the coordinate difference and the observation time of different values of the coordinate difference. For example, as shown in FIG. 13, $I'_1$ denotes the first image, $I'_2$ denotes the second image, $(x_{1i}, y_{1i})$ denotes the coordinate of the point of an initial point pair in $I_1$, and $(x_{2i}), y_{2i})$ denotes the coordinate of another point of the initial point pair in $I_2$, where $i \in [1, N]$, N is number of the initial point pairs. The coordinate difference $x_{2i}-x_{1i}$ is determined as X-axis of the histogram, the observation time of point pairs corresponding to the coordinate difference $x_{2i}-x_{1i}$ is determined as Y-axis of the histogram. An exemplary histogram by this method may be found in FIG. 14A.

In some embodiments, the two images to be spliced may be two adjacent images acquired by an X ray radiography system. When using the X-ray radiography system, the detector and the tube may move along the direction of the column or a vertical direction and the patient may keep a standing posture (also referred to stereo shooting), or may move along the X-axis direction or a horizontal direction of the plate and the patient may keep a lying posture (also referred to supine shooting). In some embodiments, the method described herein may be applied in multiple scenarios, including but not limited to a situation that the detector and the tube move along the vertical direction but not the horizontal direction and a situation that the detector and the tube move along the horizontal direction and not the vertical direction.

It should be noted that even though FIG. 13 illustrates a situation that the images are obtained when the detector and the tube move in a horizontal direction, the method may be applied in a situation that the images are obtained when the detector and the tubes move in a vertical direction.

In some embodiments, most of the initial point pairs are accurate point pairs, and few are inaccurate point pairs. Therefore, there is a cluster with largest number of the initial point pairs (e.g., corresponding to a particular coordinate difference) in the histogram. The point pairs in the cluster with largest number of the initial point pairs are most likely the accurate point pairs. Accordingly, the processing module 320 may retain that cluster with the largest number of the initial point pairs, and remove the other point pairs. It is noted that there may be the same number of the initial point pairs in different clusters, and hence a mean filtering may be performed to the histogram in order to average the adjacent clusters. In some embodiments, if the peak of the cluster with largest number of initial point pairs cannot be obtained by this method, another method as follows may be used to determine the accurate point pairs. For example, the coordinate differences of the initial point pairs mentioned above may be replaced by the slopes of the initial point pairs. The slopes $K_i$ of a point pair, as in the above example, may be calculated as follows:

$$K_i = \frac{(y_{2i} - y_{1i})}{(x_{2i} - x_{1i+W1})}, \qquad (10)$$

The slopes $K_i$ may be determined as the X-axis of the histogram, while the number of initial point pairs corresponding to the slopes $K_i$ may be determined as the Y-axis of the histogram. Similarly, the accurate point pairs may be in a cluster with the highest number of initial point pairs and may be selected according to the histogram. An exemplary histogram by this method may be found in FIG. 14B. It should be noted that features of points pairs other than the coordinate difference or the slope may be considered in generating the histogram and/or determining accurate point pairs. The other features may include but are not limited to the direction, distance, or coordinate difference between points in same or different point pairs.

Figure 9:
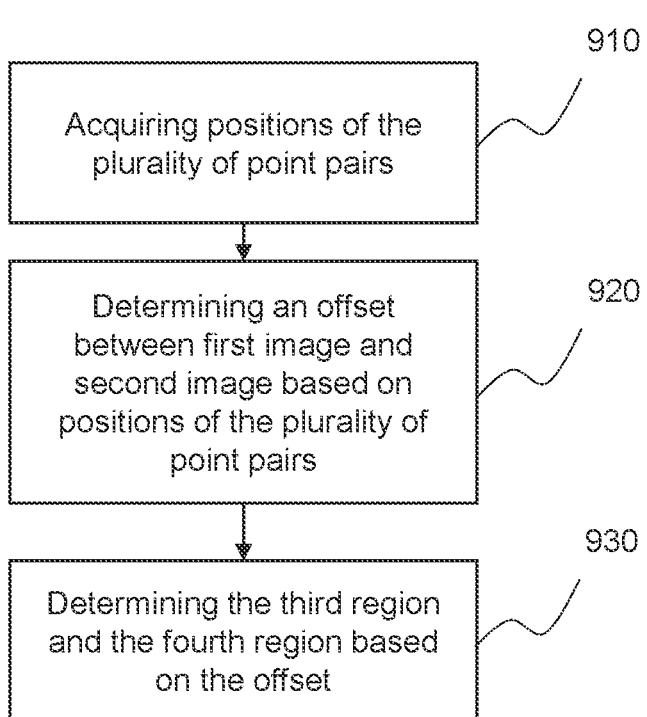
FIG. 9 is a flowchart illustrating an exemplary process for determining overlapping region according to some embodiments of the present disclosure.

FIG. 9 is a flowchart illustrating an exemplary process for determining overlapping region according to some embodiments of the present disclosure. The process 900 may be stored in the storage module 330, and may be performed by processing module 320.

In step 910, the processing module 320 may acquire positions of the plurality of the point pairs. In some embodiments, the positions of each of the plurality of the point pairs may refer to the coordinates of two points of the point pairs.

In step 920, the processing module 320 may determine an offset between the first image and the second image based on the positions of the plurality of the point pairs. In some embodiments, the average of the X-coordinate differences of the point pairs is determined as the offset of the first image and the second image in the horizontal direction $\Delta x$, and the average of the Y-coordinate differences of the point pairs is determined as the offset of the first image and the second image in the vertical direction $\Delta y$. For example, the number of the point pairs is K, the points of the point pairs in the first image $I_1$ is $(x_{1i}, y_{1i})$, the points of the corresponding point pairs in the second image $I_2$ is $(x_{2i}, y_{2i})$. Then the offset $\Delta x$ of the first image and the second image may be expressed as:

$$\Delta x = \frac{\sum_{i=1}^{K} (x_{2i} - x_{1i})}{K}, \tag{11}$$

the offset $\Delta y$ of the first image and the second image may be expressed as:

$$\Delta y = \frac{\sum_{i=1}^{K} (y_{2i} - y_{1i})}{K}, \tag{12}$$

In some embodiments, the offset of the first image and the second image in the horizontal direction is very small (e.g., stereo shooting or vertical splicing), and the offset $\Delta x$ tends to be zero. In some embodiments, the offset of the first image and the second image in the vertical direction is very small (e.g., supine shooting or horizontal splicing), and the offset $\Delta y$ tends to be zero. Depending on the relative positions between the first image and the second image, the calculation of $\Delta x$ and $\Delta y$ may be different. Detailed description of calculation of $\Delta x$ and $\Delta y$ may be found in FIG. 16.

In step 930, the processing module 320 may determine the third region and the fourth region based on the offset. The third region is the overlapping region in the first image, and the fourth region is the overlapping region in the second image. As mentioned above, the third region is in the first region and fourth region is in the second region. As shown in FIG. 16A, the first region and the second region are the initial overlapping region, which have the same size. Specifically, a rectangular coordinate system with horizontal right as the increasing direction of the X-axis and vertical down as the increasing direction of the Y-axis may be built. In some embodiments, the size of the first region $I'_1$ and the second region $I'_2$ are the same, in other words, the height and width of $I'_2$ and $I_2$ are the same. The relative position of the upper boundaries of the first region and the second region is determined as the offset $\Delta y$ in the vertical direction, and the relative position of the left boundaries of the first region and the second region is determined as the offset $\Delta x$ in the horizontal direction. The overlapping region of the first region and the second region in the rectangular coordinate system is determined as the third region 13 and the fourth region 14.

Figure 10:
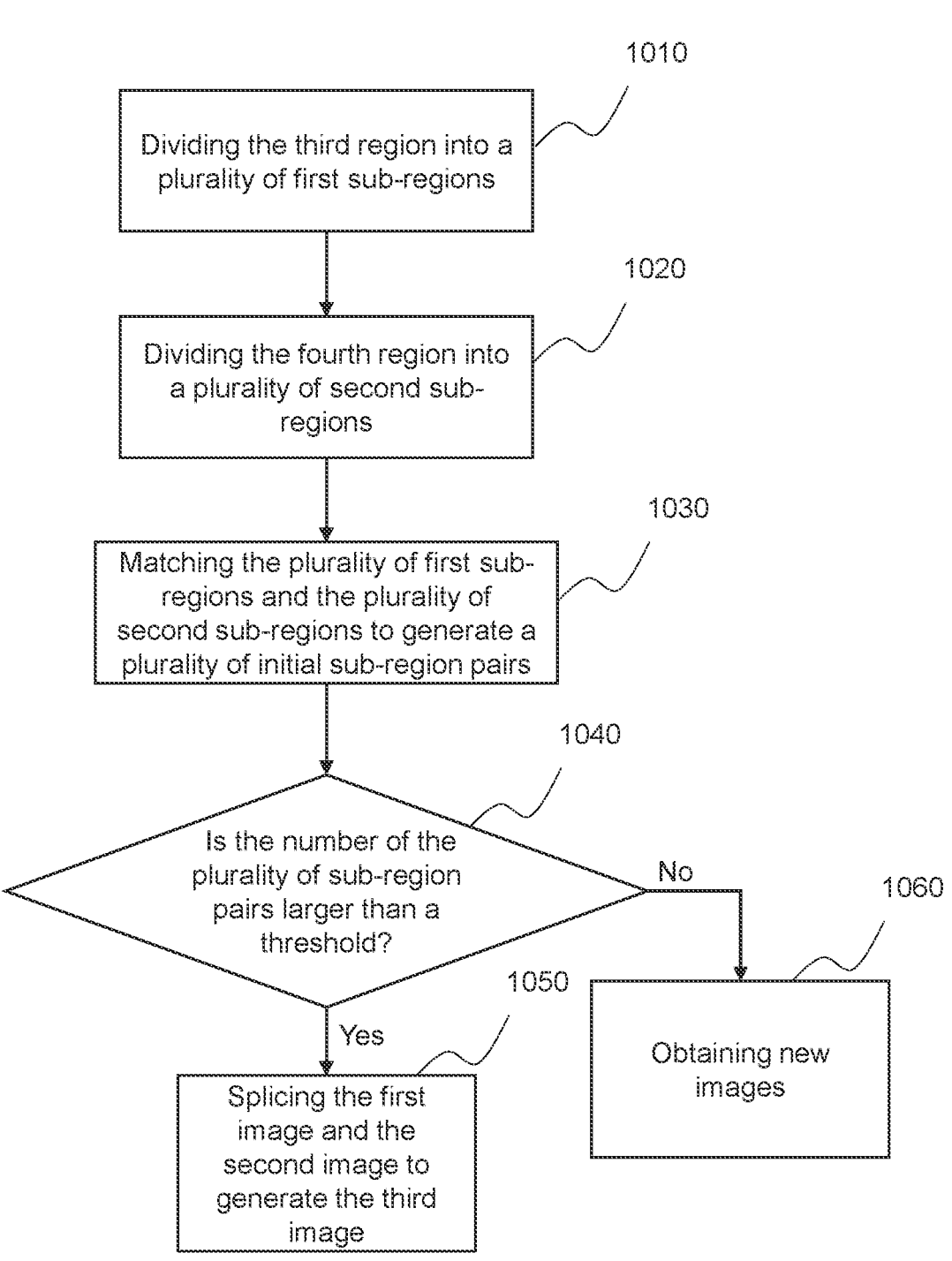
FIG. 10 is a flowchart illustrating an exemplary process for splicing images according to some embodiments of the present disclosure.

FIG. 10 is a flowchart illustrating an exemplary process for splicing images according to some embodiments of the present disclosure. The process 1000 may be stored in the storage module 330, and may be performed by image splicing module 340.

In step 1010, the image splicing module 340 may divide the third region into a plurality of first sub-regions. In step 1020, the image splicing module 340 may divide the fourth region into a plurality of second sub-regions. In some embodiments, the first sub-regions and the second sub-regions are divided into a same preset size. In some embodiments, the preset size may be 10 to 50 pixel points. For example, the size of the third region is 500×500 pixel points, and the preset size is 10×10 pixel points. Then the third region may be divided to 2500 sub-regions each with a size of 10×10 pixel points.

In step 1030, the image splicing module 340 may match the plurality of first sub-regions and the plurality of second sub-regions to generate a plurality of initial sub-region pairs. The image splicing module 340 may match the first sub-regions and the second sub-regions based on the feature vectors to generate the initial sub-region pairs. For example, the image splicing module 340 may acquire the feature vectors of every first sub-region and every second sub-region. Then the image splicing module 340 may determine the center point of a first sub-region as a feature point, and determine a first feature vector of the feature point as the first feature vector of the first sub-region. The image splicing module 340 may determine the center point of a second sub-region as a feature point, and determine a second feature vector of the feature point as the second feature vector of the second sub-region. The first feature vector may be determined by the feature information of the other pixel points of the first sub-region. The second feature vector may be determined by the feature information of the other pixel points of the second sub-region. In some embodiments, the feature information may relate to gradient amplitudes and gradient directions of the other pixel points. Then the image splicing module 340 may match the first sub-regions with the second sub-regions with the same gradient amplitudes and gradient directions of the feature vectors. In some embodiments, the image splicing module 340 may match the first sub-regions with the second sub-regions based on the Euclidean distances of the feature vectors. The method of matching the sub-regions is similar to the method of matching point pairs in process 800, and is not repeated herein.

In step 1040, the image splicing module 340 may count the number of the plurality of sub-region pairs, and may determine whether the number of the plurality of sub-region pairs is larger than a threshold or not. If the number of the plurality of sub-region pairs is less than a threshold, then the process 1000 may proceed to step 1060. Otherwise, the process 1000 may proceed to step 1050.

In step 1060, new images may be obtained to replace the current first image and the second image. In some embodiments, either the first image or the second image may be replaced. Alternatively, both of the first image and the second image may be replaced by the new images. The obtained new images may undergo the same process as the first image and the second image, e.g., extreme points determination, point pairs matching, etc. to generate two splicing regions. The process 1000 may be performed based on the splicing regions to determine whether the new images are spliced well. In some embodiments, the threshold is preset and associated with the accuracy of splicing images, and the threshold may vary between 1 and 50. For example, the threshold may be 20. In this case, if the number of the sub-region pairs is larger than 20, then the image splicing may be accurate, otherwise, it may not be accurate. In step 1050, the image splicing module 340 may splice the first image and the second image to generate a third image (also referred to as a spliced image).

Figure 11:
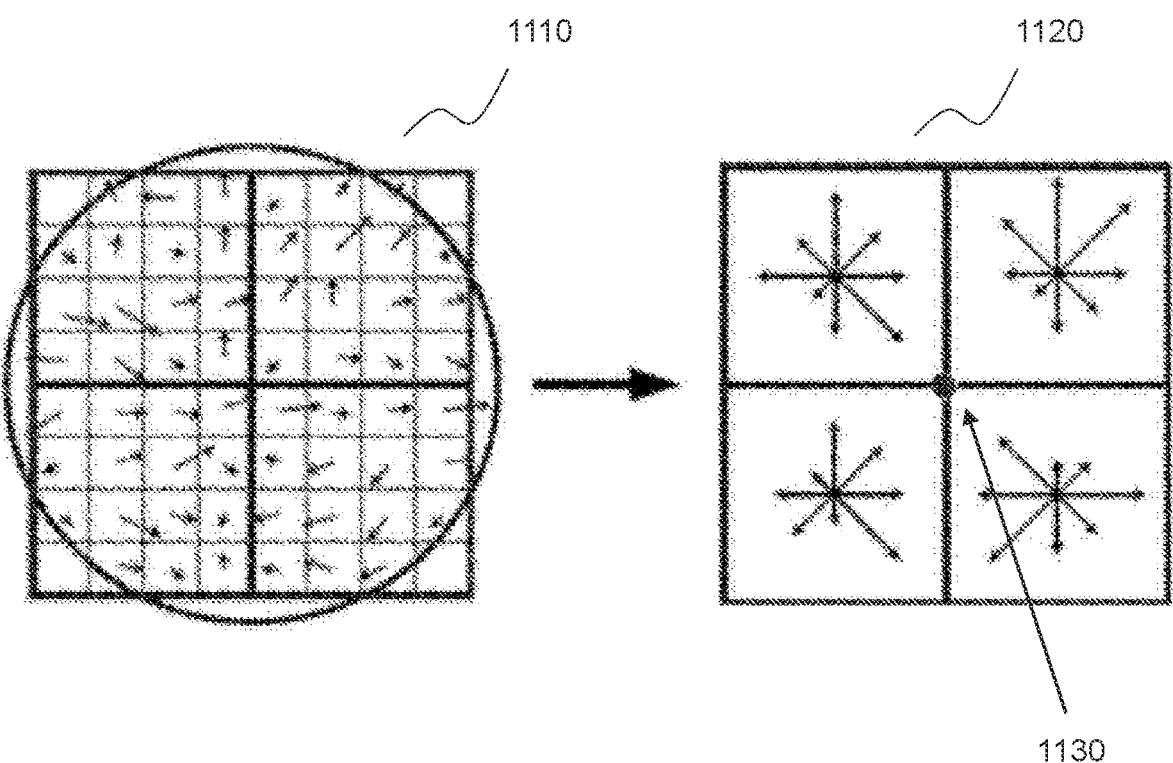
FIG. 11 is a schematic diagram illustrating exemplary feature vectors associated with feature points according to some embodiments of the present disclosure.

FIG. 11 is a schematic diagram illustrating exemplary feature vectors associated with feature points according to some embodiments of the present disclosure. As shown in FIG. 11, the processing module 320 may calculate the gradients, gradient amplitudes and gradient directions of the pixel points in the preset neighborhood of every feature point, and perform a statistical analysis on the gradient amplitudes and gradient directions of the pixel points in the neighborhood region via a histogram. The feature point is shown as an origin (center point) 1130 in the FIG. 11, and the neighborhood region may be determined as a circle centered at the feature point with a radius of a preset value. The radius may be obtained by the following formula (13):

$$\text{radius} = \frac{3\sigma_{oct} \times \sqrt{2} \times (d+1) + 1}{2}, \tag{13}$$

where $\sigma_{oct}$ denotes the scale of the Gaussian kernel of the difference pyramid image, and d is a variable which is associated with the accuracy of the feature vectors' description regarding the neighborhood regions and executing time of the formula (13). The parameter d may vary between 2 and 8. When the neighborhood region is determined, the gradient grad I(x, y), gradient amplitude m(x, y) and gradient direction θ(x, y) may be determined by the following formulae (14)-(16):

$$gradI(x, y) = \left(\frac{\partial I}{\partial x}, \frac{\partial I}{\partial y}\right) \tag{14}$$

$$m(x, y) = \sqrt{(L(x+1, y) - L(x-1, y))^2 + (L(x, y+1) - L(x, y-1))^2} \tag{15}$$

$$\theta(x, y) = \arctan\left[\frac{L(x, y+1) - L(x, y-1)}{L(x+1, y) - L(x-1, y)}\right] \tag{16}$$

As shown in FIG. 11, the FIG. 1110 has 64 pixel points (represented by 64 cells), and the gradient amplitude and gradient direction of every pixel point are represented by small arrows with directions and sizes. In order to perform the statistical analysis of the gradient amplitudes and gradient directions of the 64 pixel points, the processing module 320 may segment the 8×8 cell into four 4×4 cells, and perform the statistical analysis of the gradient amplitudes and gradient directions of the pixel points in the four 4×4 cells. For each 4×4 cell, the processing module 320 may build a histogram of gradient with eight directions. For example, the gradient directions may include 0°, 45°, 90°, 135°, 180°, 225°, 270°, 315°, and 360°. In some embodiments, if the gradient direction of a pixel point is larger than 0° but less than 45°, then the gradient direction of the pixel point is determined as 45°; if the gradient direction of a pixel point is larger than 45° but less than 90°, then the gradient direction of the pixel point is determined as 90°, and so on. Furthermore, the size of the arrow represents the superposition of the gradient amplitudes of different pixel points in each of the four 4×4 cells. In some embodiments, the center 1130 of the FIG. 1120 is the feature point, and in order to represent the distance between the different pixel points and the feature points, the processing module 320 may attach the Gaussian weight to the gradient amplitude of every pixel point. So a feature point gets a 4×8-32 dimensional vector, the descriptor W of the 32 dimensional vector of the feature point may be expressed as:

$$W = (w_1, w_2, \ldots, w_{32}). \tag{17}$$

Besides, the processing module 320 may standardize the descriptor W in order to reduce the influence of uneven illumination on the neighborhood region of the feature point. The standardization may be executed by the following formula (18):

$$l_j = w_j \Big/ \sqrt{\sum_{i=1}^{32} w_i}, j = 1, 2, \ldots 32 \tag{18}$$

The feature vector L of the standardized feature point may be expressed as:

$$L = (l_1, l_2, \ldots l_{32}) \tag{19}$$

Figure 12:
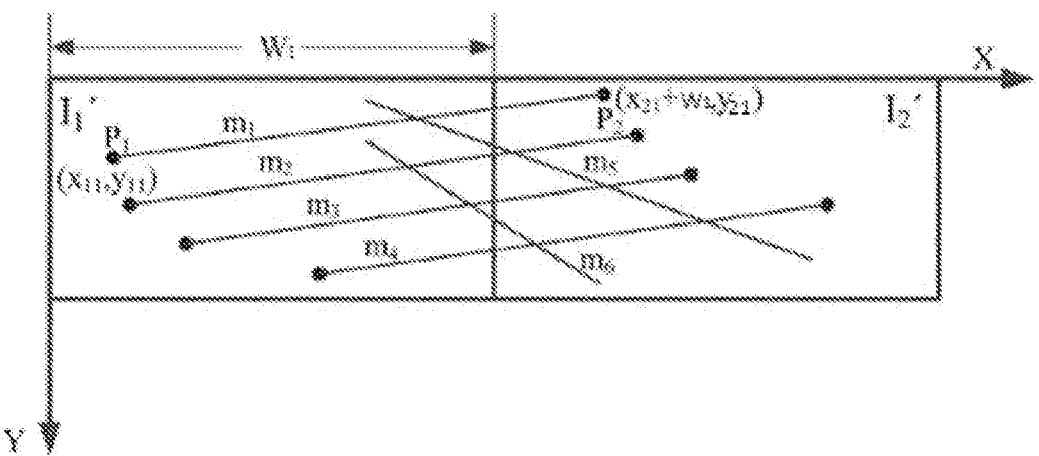
FIG. 12 is a schematic diagram illustrating exemplary process of determining point pairs based on the slope of the two points of each of the initial point pair according to some embodiments of the present disclosure.

FIG. 12 is a schematic diagram illustrating exemplary process of determining point pairs based on the slope of the two points of each of the initial point pair according to some embodiments of the present disclosure. As shown in FIG. 12, the first region $I'_1$ and second region $I'_2$ are adjacent and placed horizontally to each other. The top left corner of the first region $I'_1$ may be an origin of a rectangular coordinate system in which the first region $I'_1$ and the second region $I'_2$ reside. The upper boundaries of the first region $I'_1$ and the second region $I'_2$ are on the X-axis, the left boundary of the first region $I'_1$ is on the Y-axis. The points $P_1$ and $P_2$ are two points of an initial point pair, wherein $P_1$ is in the first region $I'_1$ with a coordinate of $(x_{11}, y_{11})$. The point $P_2$ is in the second region $I'_2$ with a coordinate of $(x_{21}+W, y_{21})$, and $m_1$ is the line connecting $P_1$ and $P_2$. The slope Km, of the line $m_1$ may be determined by the following formula (20):

$$K_{m_1} = \frac{y_{21} - y_{11}}{x_{21} - x_{11} + w1} \tag{20}$$

Similarly, for other point pairs, the slope of the line connecting the two points of each of the initial point pairs may be expressed as:

$$K_i = \frac{y_{2i} - y_{1i}}{x_{2i} - x_{1i} + w1} \quad (21)$$

where $K_i$ denotes the slope of the line connecting the two points of the $i^{th}$ initial point pair, $(x_{1i}, y_{1i})$ denotes coordinate of the point of the $i^{th}$ initial point pair in the first region, $I'_1$, $(x_{2i}, y_{2i})$ denotes the coordinate of the point of the $i^{th}$ initial point pair in the second region, and $I'_2$, w1 is the width of the first region. Based on the above formula, the slopes of the initial point pairs may be calculated. The calculated slopes may be processed, e.g. by a statistical analysis in a histogram as illustrated in process 800. Based on the histogram, a plurality of point pairs may be determined from the initial point pairs. An exemplary histogram generated by this method may be found in FIG. 14B.

FIG. 13 is a schematic diagram illustrating exemplary process of determining point pairs based on the coordinates of each of the two points of the initial point pair according to some embodiments of the present disclosure. The FIG. 13 is similar to FIG. 12. But the offset in the vertical direction between the first region and the second region is relatively small (e.g., the slope between the two points of each of the initial point pairs may be close and may generate a high error in the determination of the point pairs). As shown in FIG. 13, the points $P_1$, $P_2$, $P_3$, $P_4$, $P_5$, $P_6$ and points $P'_1$, $P'_2$, $P'_3$, $P'_4$, $P'_5$, $P'_6$, are six accurate initial point pairs, points $P_7$, $P_8$ and points $P'_7$, $P'_8$ are two inaccurate initial point pairs. If all the slopes of the lines connecting two points of these initial point pairs are counted in a histogram, the inaccurate initial point pairs may also be determined as accurate initial points pairs because their slopes are similar. In order to solve this problem, the coordinate differences between two points of different initial point pairs may be calculated instead of the slopes. Fox example, in FIG. 13, the X-coordinate differences for all initial point pairs may be determined by the following formula (22):

$$d_{xi} = (x_{2i} - x_{1i}) \quad (22)$$

where $d_{xi}$ denotes the coordinate difference of the $i^{th}$ initial point pair, $x_{1i}$ denotes the X-coordinate of the point of the $i^{th}$ initial point pair in the first region $I'_1$, and $x_{2i}$ denotes the X-coordinate of the point of the $i^{th}$ initial point pair in the second region $I'_2$. The Y-coordinate differences for all initial point pairs may be determined by the following formula (23):

$$d_{yi} = (y_{2i} - y_{1i}), \quad (23)$$

where $d_{yi}$ denotes the coordinate difference of the $i^{th}$ initial point pair, $y_{1i}$ denotes the Y-coordinate of the point of the $i^{th}$ initial point pair in the first region $I'_1$, and $y_{2i}$ denotes the Y-coordinate of the point of the $i^{th}$ initial point pair in the second region $I'_2$.

It should be noted that the method of determining point pairs described above may be applied in multiple scenarios, including not not limited to a situation that an offset between the two images is relatively large in the horizontal direction and relatively small in the vertical direction, or a situation that an offset between the two images is relatively large in the vertical direction and relatively small in the horizontal direction.

FIG. 14-A and FIG. 14-B are schematic diagrams illustrating exemplary histograms according to some embodiments of the present disclosure. In FIG. 14-A, the X-axis of the histogram is the coordinates difference of two points of point pairs, and the Y-axis of the histogram is the number of point pairs corresponding to the coordinates difference. It is obvious that a cluster of point pairs with a coordinates difference around 2 is larger than other clusters in the histogram. Therefore, the point pairs with coordinates differences around 2 may be considered as accurate point pairs, and other point pairs may be considered as inaccurate point pairs.

In FIG. 14-B, the X-axis is the slopes of the lines connecting the two points of point pairs, and the Y-axis is the number of point pairs corresponding to the slopes of lines. It is obvious that a cluster of point pairs with a slope around 1 is larger than other clusters in the histogram. Therefore, the point pairs with slopes around 1 may be considered as accurate point pairs, and other point pairs may be considered as inaccurate point pairs.

Figure 15:
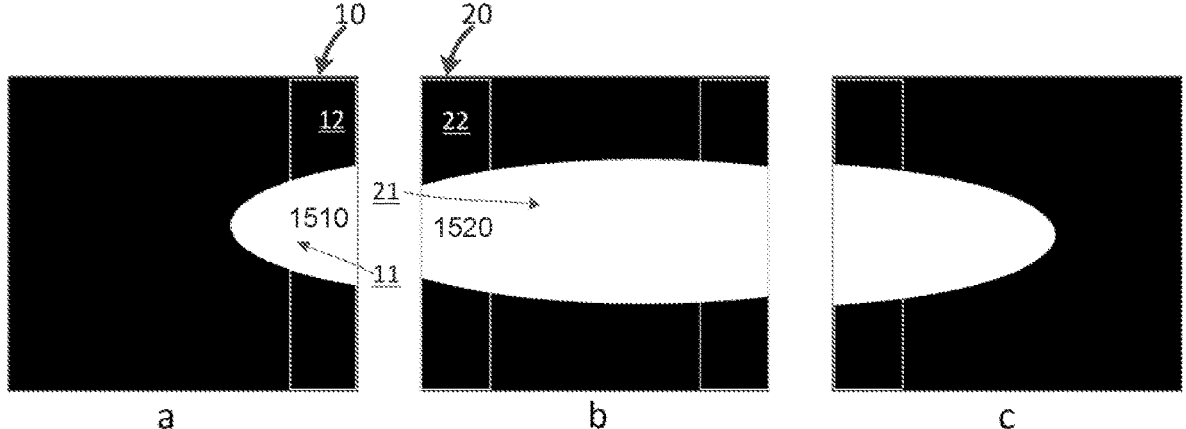
FIG. 15 is a schematic diagram illustrating an exemplary image splicing process according to some embodiments of the present disclosure.

FIG. 15 is a schematic diagram illustrating an exemplary image splicing process according to some embodiments of the present disclosure. As shown in FIG. 15, there are three images a, b, c to be spliced. The image splicing module 340 may first splice the image a and image b to generate an spliced image ab, then splice the spliced image ab and image c. The following description takes the method of splicing image a and image b as an example. However, it should be noted that the image ab and c may be spliced in a similar way.

In some embodiments, the image splicing module 340 may determine a first region of interest 11 (ROI) in the image a and a second ROI 21 in the image b. The image splicing module 340 may then calculate the overlapping region 10 in image a (also referred to as a first region) and the overlapping region 20 in image b (also referred to as a second region) based on the sizes and positions of the upper and lower boundaries of image a and image b. Then the image splicing module 340 may determine the intersection region of the first ROI 11 and overlapping region 10 in image a as the third region 1510, and determine the intersection region of the second ROI 21 and overlapping region 20 in image b as the fourth region 1520. Then the image splicing module 340 may calculate the grayscale range of the third region 1510 and the fourth region 1520, and determine the image with larger grayscale range as the reference image. Suppose that the image a is determined as the reference image, then the image splicing module 340 may calculate the correction slope Kc based on the grayscale range of the third region 1510 and the grayscale range of the fourth region 1520 by the following formula (24):

$$K_c = \frac{\text{grayscale range of third region}}{\text{grayscale range of fourth region}}. \quad (24)$$

Then the image splicing module 340 may further calculate the intercept $b_{int}$ based on the grayscale average of the third region 1510, the grayscale average of the fourth region 1520, and the correction slope $K_c$ by the following formula (25): $b_{int}$=grayscale average of third region−grayscale average of fourth region×$K_c$. (25)

Finally, the image splicing module 340 may correct the grayscale of the pixel points in the ROI of image b based on the correction slope K, and intercept $b_{int}$, which may make the spliced image in a same grayscale.

In some embodiments, non-ROI region (e.g., region 12 and 22 in FIG. 15) may be the background region of the image. If the grayscale of the background region is not consistent, the determination of the third region and fourth region may be inaccurate. In some embodiments, the non-ROI region may be corrected by using a method of compression curve, which compresses the non-ROI regions of the two images to a same or similar grayscale, and the formula of compression may be expressed as:

$$y = \begin{cases} \sin\left(x\frac{\pi}{2}\right)^\alpha & x \le T \\ x & x > T' \end{cases} \quad (25)$$

wherein x denotes the grayscale of the pixel points in the non-ROI region before correction, and y denotes the grayscale of the pixel points in the non-ROI region after correction. T may denote a threshold. In some embodiments, the threshold T may be set manually, or may be automatically calculated according to the mean and variance of the grayscales of pixel points in the non-ROI region. When x≤T, the grayscales of the pixel points is compressed (e.g., reduced according to the formula (25)); when x>T, the grayscales of the pixel points remain unchanged. In some embodiments, the threshold T is configured such that the grayscales of most or all of the pixel points in the ROI region is greater than T and the grayscales of most or all of the pixel points in the non-ROI region is less than T.

In some embodiments, α may denote the degree of compression. One of the splicing images (e.g., a or b) may be selected as a reference image. The average grayscales of non-ROI region of the reference image and non-ROI region of the non-reference image may be obtained. The average grayscale of the non-ROI region of the reference image may be designated as y and the average grayscale of the non-ROI region of the non-reference image may be designated as x. By substituting the x and y into the upper half of formula (25), e.g., $$y = \sin\left(x\frac{\pi}{2}\right)^\alpha,$$

α may be calculated.

FIG. 16-A, FIG. 16-B, FIG. 16-C and FIG. 16-D are schematic diagrams illustrating exemplary relative positions of the first image and the second image that are spliced according to some embodiments of the present disclosure. The processing module 320 may build a rectangular coordinate system with the horizontal right as the increasing direction of X-axis, vertical down as the increasing direction of the Y-axis. The size of the first region $I'_1$ and the second region $I'_2$ are the same, in other words, the height and width of $I'_1$ and $I'_2$ are the same. The relative position of the upper boundaries of the first region and the second region is determined as the offset $\Delta y$ in the vertical direction, and the relative position of the left boundaries of the first region and the second region is determined as the offset $\Delta x$ in the horizontal direction. In some embodiments, there may exist four possible relative positions between the first image and the second image, e.g., when $\Delta x>0, \Delta y>0$; $\Delta x>0$, $\Delta y<0$; $\Delta x<0$, $\Delta y>0$; and $\Delta x<0$, $\Delta y<0$. These four relative positions are described in FIG. 16-A, FIG. 16-B, FIG. 16-C and FIG. 16-D respectively.

In FIG. 16-A, $\Delta x>0$, $\Delta y>0$, the upper boundaries of $I'_1$ and $I'_2$ are both placed in the increasing direction of Y-axis, the upper boundary of 12 is under the upper boundary of $I'_1$, and the offset in the increasing direction of Y-axis between the upper boundary of $I'_2$ and the upper boundary of $I'_1$ is the offset $\Delta y$ in the vertical direction of $I'_1$ and $I'_2$. The height of the overlapping region of $I'_1$ and $I'_2$ may be calculated as H−$\Delta y$. Similarly, the width of the overlapping region of $I'$ and $I'_2$ may be calculated as W−$\Delta x$. Then the overlapping region may be determined based on the height and width of the overlapping region, which means the third region and the fourth region may be determined.

Similarly, in FIG. 16-B, $\Delta x>0$, $\Delta y<0$, the height of the overlapping region of $I'_1$ and $I'_2$ may be calculated as H+$\Delta y$, the width of the overlapping region of $I'_1$ and $I'_2$ may be calculated as W−$\Delta x$. In FIG. 16-C, $\Delta x<0$, $\Delta y>0$, the height of the overlapping region of $I'_1$ and $I'_2$ may be calculated as H−$\Delta y$, the width of the overlapping region of $I'_1$ and $I'_2$ may be calculated as W+$\Delta x$. In FIG. 16-D, $\Delta x<0$, $\Delta y<0$, the height of the overlapping region of $I'_1$ and $I'_2$ may be calculated as H+$\Delta y$, the width of the overlapping region of $I'_1$ and $I'_2$ may be calculated as W+$\Delta x$. When the overlapping region is determined, the image splicing module 340 may begin to splice the first image and the second image based on the overlapping region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method implemented on a computing device including at least one processor and a storage, the method comprising:

acquiring a spliced medical image spliced by a first medical image and a second medical image, the first medical image and the second medical image having an overlapping region; and determining whether the splicing of the first medical image and the second medical image in the spliced medical image is correct, including:

dividing a first overlapping region of the first medical image into a plurality of first sub-regions;

dividing a second overlapping region of the second medical image into a plurality of second sub-regions;

matching the plurality of first sub-regions and the plurality of second sub-regions to generate a plurality of sub-region pairs;

determining whether a number of the plurality of sub-region pairs is greater than a threshold; and upon a determination that the number of the plurality of sub-region pairs is greater than the threshold, determining that the splicing of the first medical image and the second medical image is correct.

2. The method of claim 1, wherein the plurality of first sub-regions are non-directly exposure regions in the first overlapping region and the plurality of second sub-regions are non-directly exposure regions in the second overlapping region.

3. The method of claim 2, further comprising:

determining an intersection of non-directly exposure regions of the first overlapping region and non-directly exposure regions of the second overlapping region; and determining the plurality of first sub-regions and the plurality of second sub-regions based on the intersection.

4. The method of claim 1, wherein the matching the plurality of first sub-regions and the plurality of second sub-regions to generate a plurality of sub-region pairs comprises:

matching the plurality of first sub-regions and the plurality of second sub-regions to generate a plurality of initial sub-region pairs, each of the plurality of initial sub-region pairs including a first sub-region and a second sub-region;

for each initial sub-region pair of the plurality of initial sub-region pairs, determining whether a first position of the first sub-region is the same as a second position of the second sub-region; and in response to a determining that the first position of the first sub-region is the same as the second position of the second sub-region, designating the initial sub-region pair as one of the plurality of sub-region pairs.

5. The method of claim 1, wherein the matching the plurality of first sub-regions and the plurality of second sub-regions to generate a plurality of sub-region pairs comprises:

acquiring a plurality of first feature vectors of the plurality of first sub-regions and a plurality of second feature vectors of the plurality of second sub-regions;

bidirectional matching the plurality of first sub-regions and the plurality of second sub-regions based on the plurality of first feature vectors and the plurality of second feature vectors to generate the plurality of sub-region pairs.

6. The method of claim 1, wherein the matching the plurality of first sub-regions and the plurality of second sub-regions to generate a plurality of sub-region pairs comprises:

matching the plurality of first sub-regions and the plurality of second sub-regions to generate the plurality of sub-region pairs based on gradient amplitudes and gradient directions of feature vectors of the plurality of first sub-regions and the plurality of second sub-regions.

7. The method of claim 6, wherein the matching the plurality of first sub-regions and the plurality of second sub-regions to generate the plurality of sub-region pairs based on gradient amplitudes and gradient directions of feature vectors of the plurality of first sub-regions and the plurality of second sub-regions comprises:

acquiring a plurality of first feature vectors of the plurality of first sub-regions and a plurality of second feature vectors of the plurality of second sub-regions;

matching the plurality of first sub-regions and the plurality of second sub-regions based on the plurality of first feature vectors and the plurality of second feature vectors to generate the plurality of sub-region pairs.

8. The method of claim 7, wherein the matching the plurality of first sub-regions and the plurality of second sub-regions based on the plurality of first feature vectors and the plurality of second feature vectors to generate the plurality of sub-region pairs comprises:

matching the plurality of first sub-regions with the plurality of second sub-regions based on Euclidean distances of the plurality of first feature vectors and the plurality of second feature vectors.

9. The method of claim 7, wherein the acquiring the plurality of first feature vectors of the plurality of first sub-regions and the plurality of second feature vectors of the plurality of second sub-regions comprises:

for each sub-region of the plurality of first sub-regions and the plurality of second sub-regions, determining a center pixel point of the sub-region as a feature point; and determining a feature vector of the feature point as a feature vector of the sub-region.

10. The method of claim 9, wherein the feature vector of the feature point is determined by feature information of other pixel points of the sub-region.

11. The method of claim 10, wherein the feature information is related to gradient amplitudes and gradient directions of the other pixel points.

12. The method of claim 11, wherein the matching the plurality of first sub-regions and the plurality of second sub-regions to generate the plurality of sub-region pairs based on gradient amplitudes and gradient directions of feature vectors of the plurality of first sub-regions and the plurality of second sub-regions comprises:

matching the plurality of first sub-regions with the plurality of second sub-regions based on the gradient amplitudes and gradient directions of the feature vectors.

13. A system comprising:

at least one storage including a set of instructions or programs;

at least one processor configured to communicate with the at least one storage, wherein when executing the set of instructions or programs, the at least one processor is directed to:

acquire a spliced medical image spliced by a first medical image and a second medical image, the first medical image and the second medical image having an overlapping region; and determine whether the splicing of the first medical image and the second medical image in the spliced medical image is correct, including:

divide a first overlapping region of the first medical image into a plurality of first sub-regions;

divide a second overlapping region of the second medical image into a plurality of second sub-regions;

match the plurality of first sub-regions and the plurality of second sub-regions to generate a plurality of sub-region pairs;

determine whether a number of the plurality of sub-region pairs is greater than a threshold; and upon a determination that the number of the plurality of sub-region pairs is greater than the threshold, determine that the splicing of the first medical image and the second medical image is correct.

14. The system of claim 13, wherein the plurality of first sub-regions are non-directly exposure regions in the first overlapping region and the plurality of second sub-regions are non-directly exposure regions in the second overlapping region.

15. The system of claim 14, wherein the at least one processor is further directed to:

determine an intersection of non-directly exposure regions of the first overlapping region and non-directly exposure regions of the second overlapping region; and determine the plurality of first sub-regions and the plurality of second sub-regions based on the intersection.

16. The system of claim 14, wherein to match the plurality of first sub-regions and the plurality of second sub-regions to generate a plurality of sub-region pairs, the at least one processor is further directed to:

acquire a plurality of first feature vectors of the plurality of first sub-regions and a plurality of second feature vectors of the plurality of second sub-regions;

match the plurality of first sub-regions and the plurality of second sub-regions based on the plurality of first feature vectors and the plurality of second feature vectors to generate the plurality of sub-region pairs.

17. The system of claim 16, wherein to match the plurality of first sub-regions and the plurality of second sub-regions based on the plurality of first feature vectors and the plurality of second feature vectors to generate the plurality of sub-region pairs, the at least one processor is further directed to:

match the plurality of first sub-regions with the plurality of second sub-regions based on Euclidean distances of the plurality of first feature vectors and the plurality of second feature vectors.

18. The system of claim 16, wherein to acquire the plurality of first feature vectors of the plurality of first sub-regions and the plurality of second feature vectors of the plurality of second sub-regions, the at least one processor is further directed to:

for each sub-region of the plurality of first sub-regions and the plurality of second sub-regions, determine a center pixel point of the sub-region as a feature point; and determine a feature vector of the feature point as a feature vector of the sub-region.

19. The system of claim 18, wherein the feature vector of the feature point is determined by feature information of other pixel points of the sub-region.

20. A non-transitory computer-readable medium comprising executable instructions or programs that, when executed by at least one processor, cause the at least one processor to effectuate a method comprising:

acquiring a spliced medical image spliced by a first medical image and a second medical image, the first medical image and the second medical image having an overlapping region; and determing whether the splicing of the first medical image and the second medical image in the spliced medical image is correct, including:

dividing a first overlapping region of the first medical image into a plurality of first sub-regions;

dividing a second overlapping region of the second medical image into a plurality of second sub-regions;

matching the plurality of first sub-regions and the plurality of second sub-regions to generate a plurality of sub-region pairs;

determining whether a number of the plurality of sub-region pairs is greater than a threshold; and upon a determination that the number of the plurality of sub-region pairs is greater than the threshold, determining that the splicing of the first medical image and the second medical image is correct.

\* \* \* \* \*